(12) United States Patent
Sazai et al.

(10) Patent No.: US 11,550,202 B2
(45) Date of Patent: Jan. 10, 2023

(54) OPTICAL UNIT

(71) Applicant: NIDEC CORPORATION, Kyoto (JP)

(72) Inventors: Kazuhiro Sazai, Kyoto (JP); Tomohiro Egawa, Kyoto (JP); Keishi Otsubo, Kyoto (JP); Genki Tanaka, Kyoto (JP); Takayuki Iwase, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 0 days.

(21) Appl. No.: 17/488,297

(22) Filed: Sep. 29, 2021

(65) Prior Publication Data

US 2022/0100053 A1     Mar. 31, 2022

(30) Foreign Application Priority Data

Sep. 30, 2020   (JP) .............................. JP2020-165441

(51) Int. Cl.
  *G03B 17/12*      (2021.01)
  *G03B 5/06*       (2021.01)

(52) U.S. Cl.
  CPC ............... *G03B 5/06* (2013.01); *G03B 17/12* (2013.01); *G03B 2205/0023* (2013.01); *G03B 2205/0069* (2013.01)

(58) Field of Classification Search
  CPC .................................. G03B 5/06; G03B 17/12
  See application file for complete search history.

(56) References Cited

U.S. PATENT DOCUMENTS

| | | | |
|---|---|---|---|
| 8,780,264 B2 | 7/2014 | Inata et al. | |
| 9,225,899 B2 | 12/2015 | Takizawa | |
| 10,747,013 B2 | 8/2020 | Lim | |
| 2009/0161240 A1* | 6/2009 | Chang | G03B 17/12 |
| | | | 359/824 |
| 2016/0154204 A1* | 6/2016 | Lim | G02B 27/646 |
| | | | 359/557 |

FOREIGN PATENT DOCUMENTS

| | | | |
|---|---|---|---|
| JP | 2012009118 A | * | 1/2012 |
| JP | 201716114 A | | 1/2017 |
| JP | 2017187694 A | | 10/2017 |
| JP | 2019191350 A | | 10/2019 |

* cited by examiner

*Primary Examiner* — Minh Q Phan
(74) *Attorney, Agent, or Firm* — Hauptman Ham, LLP

(57) ABSTRACT

An optical unit includes a movable body, a fixed body, and a first swing mechanism. The fixed body supports the movable body so as to be swingable in a first swing direction about a first swing axis. One of the movable body and the fixed body has a first magnet. The other of the movable body and the fixed body has a first magnetic body. The first magnetic body has a first magnetic body portion, a second magnetic body portion, and a third magnetic body portion. The first magnetic body portion passes through an axis perpendicular to each of the first swing axis and the optical axis of an optical element. The second magnetic body portion is disposed on one side in the first swing direction of the first magnetic body portion. The third magnetic body portion is disposed on the other side in the first swing direction of the first magnetic body portion.

16 Claims, 12 Drawing Sheets

OPTICAL UNIT

CROSS-REFERENCE TO RELATED APPLICATIONS

The present invention claims priority under 35 U.S.C. § 119 to Japanese Patent Application No. 2020-165441 filed on Sep. 30, 2020, the entire content of which is incorporated herein by reference.

FIELD OF THE INVENTION

The present invention relates to an optical unit.

BACKGROUND

When capturing a still image or moving image with a camera, the image is sometimes blurred by camera shake. For this reason, an image stabilization device has been put into practical use to enable clear imaging with image blur prevention. When the camera shakes, the image stabilization device can remove image blur by correcting the position and orientation of a camera module according to the shake.

In order to downsize a lens driving device having an image stabilization function, it has been considered to design some of multiple rolling members supporting a shake correction unit with a higher degree of freedom than other rolling members. In a conventional lens driving device, a yoke is disposed in a position facing a magnet for swinging, so that a rolling member maintains contact between a carrier and a housing, thereby determining a position in a vertical direction.

In the conventional lens driving device, when a movable body swings with respect to a fixed body, an attractive force between the yoke and the magnet may increase driving resistance.

SUMMARY

An exemplary optical unit of the present invention includes a movable body, a fixed body, and a first swing mechanism. The movable body has an optical element. The fixed body surrounds the movable body. The fixed body supports the movable body so as to be swingable in a first swing direction about a first swing axis. The first swing mechanism swings the movable body with respect to the fixed body about the first swing axis. One of the movable body and the fixed body has a first magnet. The other of the movable body and the fixed body has a first magnetic body. The first magnetic body has a first magnetic body portion, a second magnetic body portion, and a third magnetic body portion. The first magnetic body portion passes through an axis perpendicular to each of the first swing axis and an optical axis of the optical element. The first magnetic body portion faces the first magnet. The second magnetic body portion is disposed on one side in the first swing direction of the first magnetic body portion. The third magnetic body portion is disposed on the other side in the first swing direction of the first magnetic body portion.

The above and other elements, features, steps, characteristics and advantages of the present disclosure will become more apparent from the following detailed description of the preferred embodiments with reference to the attached drawings.

DETAILED DESCRIPTION

Figure 1:
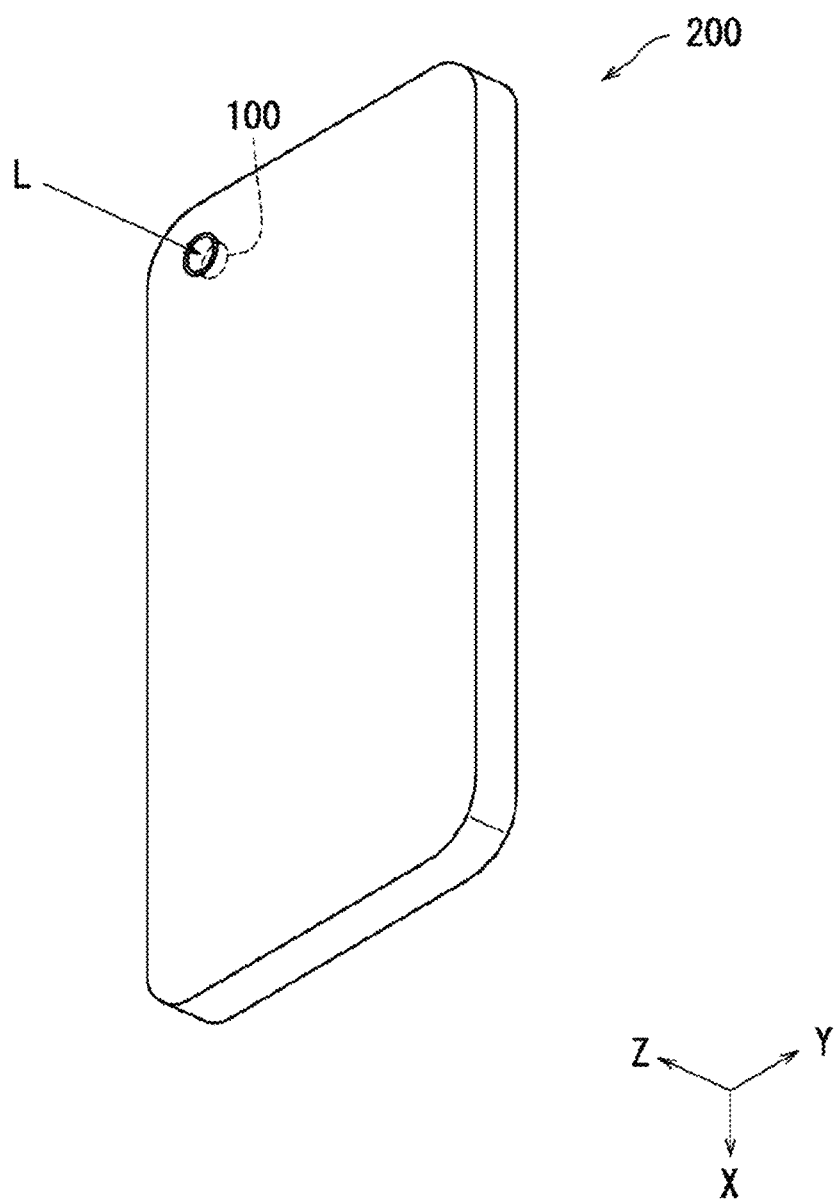
FIG. 1 is a schematic perspective view of a smartphone including an optical unit of the present embodiment.

Hereinafter, an embodiment of an optical unit according to the present invention will be described with reference to the drawings. Note that in the drawings, the same or corresponding parts will be denoted by the same reference symbols and description thereof will not be repeated. Note that in the specification of the present application, an X-axis, a Y-axis, and a Z-axis that are orthogonal to one another may be used to facilitate understanding of the invention. Here, it should be noted that the X-axis, the Y-axis, and the Z-axis do not limit the orientation of the optical unit during use.

An optical unit 100 is suitably used as an optical component of a smartphone.

First, a smartphone 200 including the optical unit 100 of the present embodiment will be described with reference to FIG. 1. FIG. 1 is a schematic perspective view of the smartphone 200 including the optical unit 100 of the present embodiment.

As illustrated in FIG. 1, the optical unit 100 is incorporated in the smartphone 200 as an example. Light L enters the smartphone 200 from the outside through the optical unit 100, and a subject image is captured on the basis of the light that enters the optical unit 100. The optical unit 100 is used to correct blur of the captured image when the smartphone 200 shakes. Note that the optical unit 100 may include an image sensor, and the optical unit 100 may include an optical member that transmits light to the image sensor.

The optical unit 100 is preferably manufactured in a small size. As a result, the smartphone 200 itself can be downsized, or another component can be incorporated in the smartphone 200 without upsizing the smartphone 200.

Note that the application of the optical unit 100 is not limited to the smartphone 200, and the optical unit 100 can be used in various devices such as cameras and videos without particular limitation. For example, the optical unit 100 may be incorporated in, for example, an imaging device such as a mobile phone with a camera or a drive recorder, or an action camera and a wearable camera incorporated in a moving body such as a helmet, a bicycle, or a radio-controlled helicopter.

Figure 2:
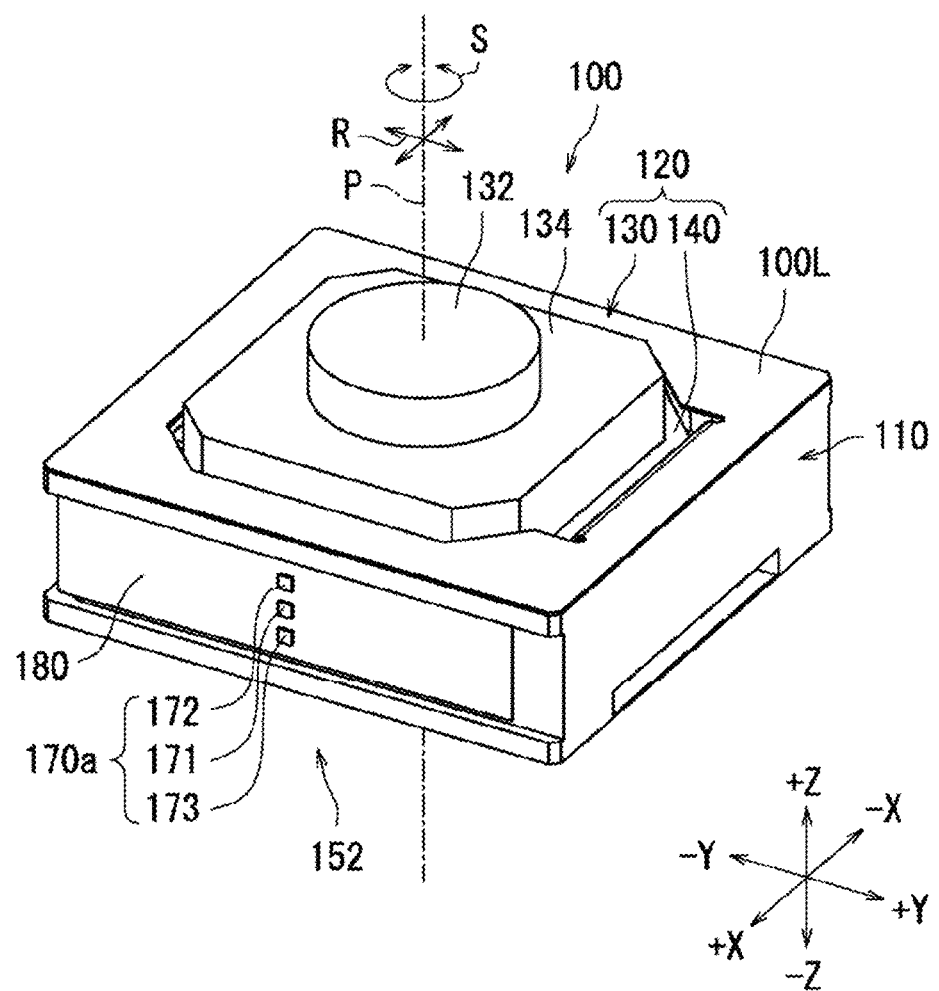
FIG. 2 is a schematic perspective view of the optical unit of the present embodiment.
Figure 3:
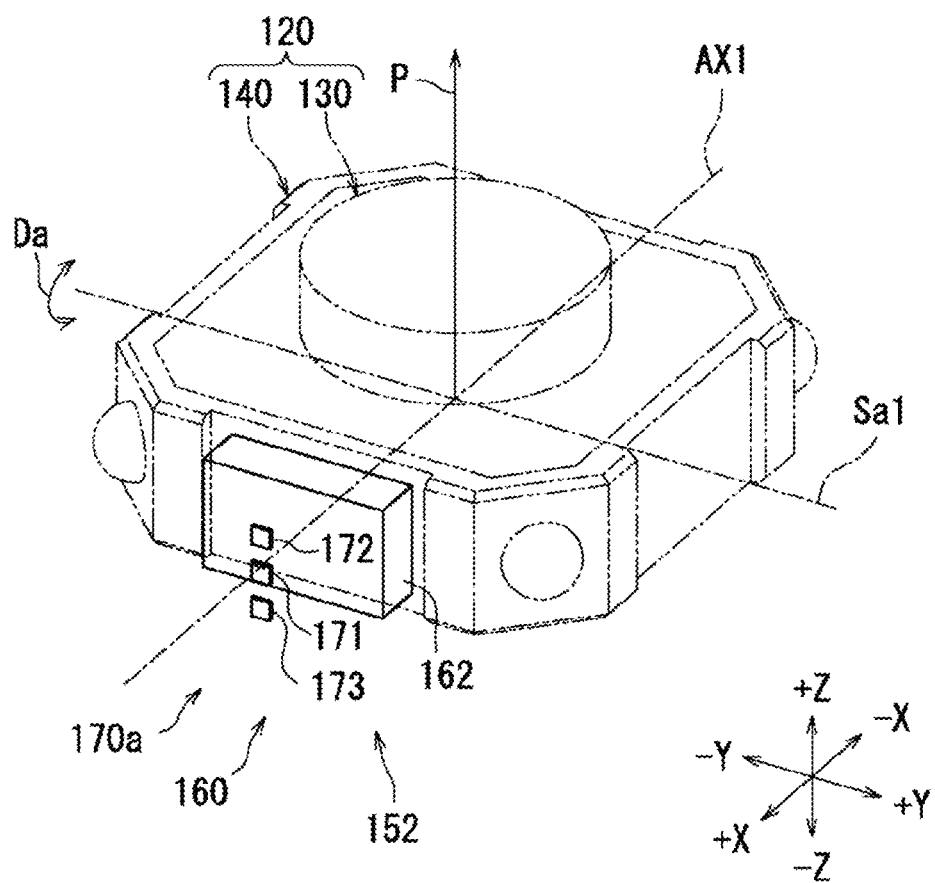
FIG. 3 is a schematic perspective view of a first swing mechanism, a magnet, and a first magnetic body in the optical unit of the present embodiment.
Figure 4A:
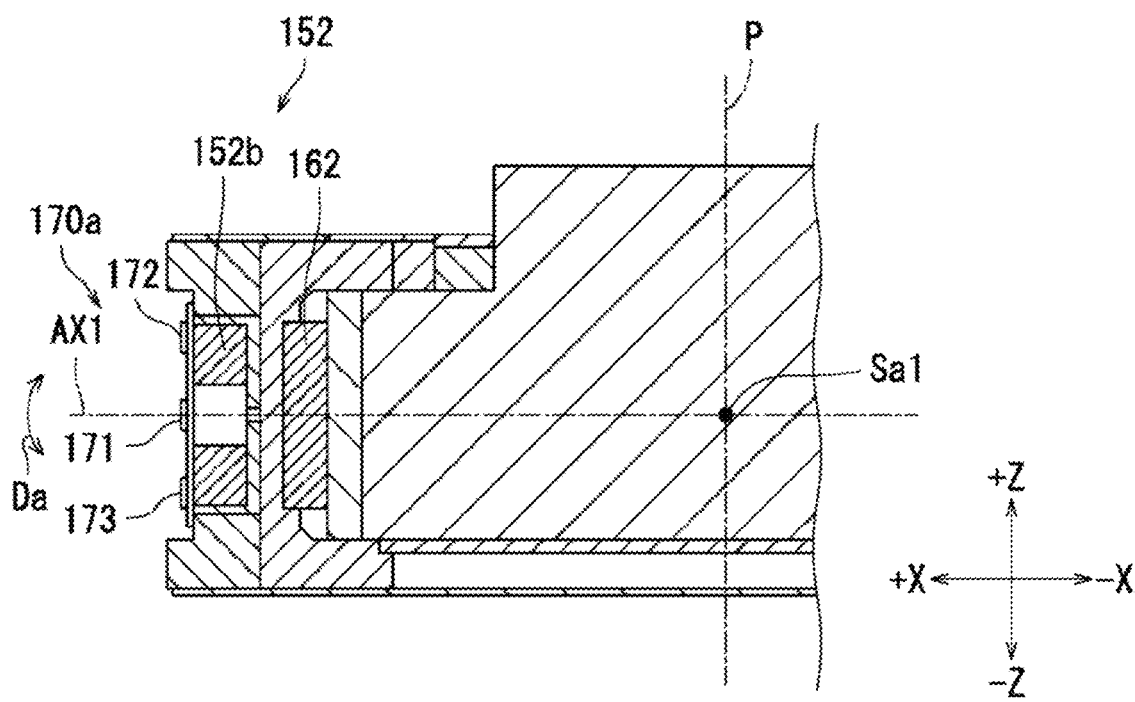
FIG. 4A is an enlarged view of a part of a cross-sectional view taken along an X-axis of FIG. 2.
Figure 4B:
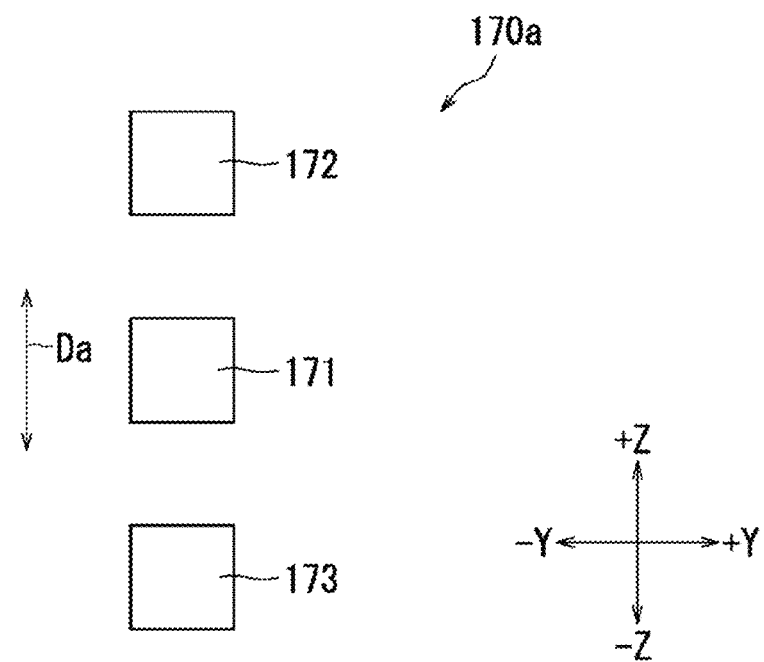
FIG. 4B is a schematic side view of the first magnetic body.

Next, a configuration of the optical unit 100 of the present embodiment will be described with reference to FIGS. 2 to 4B. FIG. 2 is a schematic perspective view of the optical unit 100 of the present embodiment, and FIG. 3 is a schematic perspective view of a first swing mechanism 152, a magnet 160, and a first magnetic body 170a in the optical unit 100 of the present embodiment. Note that in FIG. 3, a movable body 120 for reference is indicated by a two-dot chain line. FIG. 4A is an enlarged view of a part of a cross-sectional view taken along the X-axis of FIG. 2. FIG. 4B is a schematic side view of the first magnetic body 170a.

As illustrated in FIGS. 2 and 3, the optical unit 100 includes a fixed body 110, the movable body 120, and the first swing mechanism 152. The movable body 120 has an optical element 130. The movable body 120 is inserted into the fixed body 110 and held by the fixed body 110. The fixed body 110 surrounds the movable body 120. The fixed body 110 supports the movable body 120 so as to be swingable in a first swing direction Da about a first swing axis Sa1. The first swing direction Da is a direction in which the movable body 120 swings with respect to the fixed body 110 about the first swing axis Sa1. Note that the first swing axis Sa1 is a virtual axis. An FPC 180 is mounted on an outer surface of the fixed body 110.

The first swing mechanism 152 swings the movable body 120 with respect to the fixed body 110. The first swing mechanism 152 swings the movable body 120 with respect to the fixed body 110 about the first swing axis Sa1. For example, the first swing axis Sa1 extends parallel to the Y-axis direction. Here, the first swing mechanism 152 is located on the +X direction side of the movable body 120.

The optical unit 100 may further include a lid 100L. Since the lid 100L covers one side of each of the fixed body 110 and the movable body 120, it is possible to curb detachment of the movable body 120 from the fixed body 110.

The movable body 120 includes the optical element 130 and a holder 140. The optical element 130 has an optical axis P. The optical element 130 can be inserted into the holder 140.

When the movable body 120 is inserted into the fixed body 110 and the movable body 120 is mounted on the fixed body 110, the optical axis P of the optical element 130 becomes parallel to the Z-axis direction. When the movable body 120 swings with respect to the fixed body 110 from this state, the optical axis P of the optical element 130 swings, so that the optical axis P is no longer parallel to the Z-axis direction.

In the following description, it is assumed that the movable body 120 is not swung with respect to the fixed body 110 and the state in which the optical axis P is parallel to the Z-axis direction is maintained. That is, in the description of the shape, positional relationship, operation, and the like of the fixed body 110, the movable body 120, the lid 100L, and the like with reference to the optical axis P, it is assumed that the optical axis P is parallel to the Z-axis direction unless the inclination of the optical axis P is specifically described.

Note that the first swing mechanism 152 swings the movable body 120 with respect to the fixed body 110 about the first swing axis Sa1. Here, the first swing axis Sa1 is parallel to the Y-axis direction. The Y-axis direction is a direction intersecting the optical axis P, and is an axis of rotation in the yawing direction. Typically, the first swing axis Sa1 is orthogonal to the optical axis P.

Note that as described later in the present specification, a swing mechanism other than the first swing mechanism 152 may swing the movable body 120 with respect to the fixed body 110 about the X-axis direction or the Z-axis direction. The X-axis direction is a direction orthogonal to the optical axis P, and is an axis of rotation in the pitching direction. The Z-axis direction is parallel to the optical axis direction in which the optical axis P of the optical element 130 extends, and is an axis of rotation in the rolling direction.

In an optical device including the optical element 130, when the optical device is inclined at the time of imaging, the optical element 130 is inclined, and the captured image is disturbed. In order to avoid disturbance of the captured image, the optical unit 100 corrects the inclination of the optical element 130 on the basis of the acceleration, the angular velocity, the shake amount, and the like detected by detection means such as a gyroscope. In the present embodiment, the optical unit 100 corrects the inclination of the optical element 130 by swinging (rotating) the movable body 120 in a rotation direction (yawing direction) with the Y-axis as the rotation axis. Note that the optical unit 100 may correct the inclination of the optical element 130 by swinging (rotating) the movable body 120 in a rotation direction (pitching direction) with the X-axis as the rotation axis and a rotation direction (rolling direction) with the Z-axis as the rotation axis, in addition to the yawing direction.

The optical axis P of the optical element 130 is parallel to the normal line of the light incident surface of the optical element 130. Light from the optical axis P enters the optical element 130.

The optical element 130 has a lens 132 and a housing 134. The optical element 130 may have an image sensor in the housing 134. The optical element 130 including an image sensor is also called a camera module. When the optical element 130 is inserted into the holder 140, the optical element 130 is held by the holder 140.

The holder 140 has an annular shape in which both ends in the Z-axis direction are open. The optical element 130 is attached to the inside of the holder 140.

The holder 140 is a thick plate-shaped frame body extending in a direction orthogonal to the optical axis P. The direction orthogonal to the optical axis P is a direction intersecting the optical axis P and perpendicular to the optical axis P. In the present specification, a direction orthogonal to the optical axis P may be referred to as a "radial direction". Of the radial directions, radially outward indicates a direction separating from the optical axis P. In FIG. 2, reference sign R indicates an example of the radial direction. Additionally, a direction of rotation about the optical axis P may be referred to as a "circumferential direction". In FIG. 2, reference sign S indicates the circumferential direction.

The optical unit 100 of the present embodiment further includes the magnet 160. The magnet 160 includes a first magnet 162. The first magnet 162 is located on the +X direction side of the movable body 120 and extends in the Y-axis direction.

The optical unit 100 further includes a first magnetic body 170a. When the magnet 160 is provided in one of the fixed body 110 and the movable body 120, the first magnetic body 170a is provided in the other of the fixed body 110 and the movable body 120. Here, the first magnetic body 170a is attached to the FPC 180. The first magnetic body 170a is located on the +X direction side of the movable body 120.

As illustrated in FIGS. 4A and 4B, the first magnetic body 170a has a first magnetic body portion 171, a second magnetic body portion 172, and a third magnetic body portion 173.

The first magnetic body portion 171 passes through an axis AX1 perpendicular to each of the first swing axis Sa1 and the optical axis P of the optical element 130. The first magnetic body portion 171 faces the first magnet 162. Accordingly, the movable body 120 can be held at the initial position. The initial position indicates a position where the movable body 120 is not swung with respect to the fixed body 110 and a state in which the optical axis P is parallel to the Z-axis direction is maintained.

The second magnetic body portion 172 is disposed on one side in the first swing direction Da of the first magnetic body portion 171. Here, the second magnetic body portion 172 is disposed on the +Z direction side of the first magnetic body portion 171. Accordingly, when the movable body 120 is swung to one side in the first swing direction Da, the second magnetic body portion 172 can generate an attraction force as an aid. As a result, it is possible to reduce driving resistance when swinging the movable body 120 to one side in the first swing direction Da.

The third magnetic body portion 173 is disposed on the other side in the first swing direction Da of the first magnetic body portion 171. Here, the third magnetic body portion 173 is disposed on the −Z direction side of the first magnetic body portion 171. Accordingly, when the movable body 120 is swung to the other side in the first swing direction Da, the third magnetic body portion 173 can generate an attraction force as an aid. As a result, it is possible to reduce the driving resistance when swinging the movable body 120 to the other side in the first swing direction Da.

In this manner, the magnetic body is disposed along the first swing direction Da. Accordingly, it is possible to reduce the driving resistance when swinging the movable body 120 in the first swing direction Da.

The first magnetic body portion 171, the second magnetic body portion 172, and the third magnetic body portion 173 have a rectangular shape, for example. Specifically, the first magnetic body portion 171, the second magnetic body portion 172, and the third magnetic body portion 173 have a square shape. Note that the shapes of the first magnetic body portion 171, the second magnetic body portion 172, and the third magnetic body portion 173 may be different from each other.

The thicknesses of the first magnetic body portion 171, the second magnetic body portion 172, and the third magnetic body portion 173 are the same. Note that the thickness of the first magnetic body portion 171 may be thinner than the thicknesses of other magnetic body portions of the first magnetic body 170a. For example, the thicknesses of the second magnetic body portion 172 and the third magnetic body portion 173 may be twice the thickness of the first magnetic body portion 171. In this case, the plate thicknesses of the first magnetic body portion 171, the second magnetic body portion 172, and the third magnetic body portion 173 may be changed. Alternatively, the number of overlaps of the first magnetic body portion 171, the second magnetic body portion 172, and the third magnetic body portion 173 may be changed. By making the thickness of the first magnetic body portion 171 thinner than the thicknesses of other magnetic body portions of the first magnetic body 170a, it is possible to reduce the driving resistance when swinging the movable body 120 in the first swing direction Da even more.

Alternatively, the thickness of the first magnetic body portion 171 may be thicker than the thicknesses of other magnetic body portions of the first magnetic body 170a. For example, the thickness of the first magnetic body portion 171 may be twice the thickness of the second magnetic body portion 172 and the thickness of the third magnetic body portion 173. In this case, the plate thicknesses of the first magnetic body portion 171, the second magnetic body portion 172, and the third magnetic body portion 173 may be changed. Alternatively, the number of overlaps of the first magnetic body portion 171, the second magnetic body portion 172, and the third magnetic body portion 173 may be changed. By making the thickness of the first magnetic body portion 171 thicker than the thicknesses of other magnetic body portions of the first magnetic body 170a, it is easy to maintain the initial position and to return to the initial position after driving.

The first magnetic body portion 171 and the second magnetic body portion 172 are spaced apart from each other in the first swing direction Da. Additionally, the first magnetic body portion 171 and the third magnetic body portion 173 are spaced apart from each other in the first swing direction Da. In this manner, the magnetic body is disposed only in the necessary place. Accordingly, the magnetic force of the magnetic body can be minimized. As a result, it is possible to reduce the driving resistance when swinging the movable body 120 in the first swing direction Da.

Note that the first magnetic body portion 171 and the second magnetic body portion 172 may be connected with no space therebetween. Additionally, the first magnetic body portion 171 and the third magnetic body portion 173 may be connected with no space therebetween.

Based on the first magnetic body portion 171, the second magnetic body portion 172 and the third magnetic body portion 173 are disposed at positions line-symmetric with respect to a direction (X direction) perpendicular to each of the optical axis P and the first swing axis Sa1. Accordingly, a swinging operation is stabilized.

The first magnetic body portion 171, the second magnetic body portion 172, and the third magnetic body portion 173 are disposed side by side on the same plane. Here, the first magnetic body portion 171, the second magnetic body portion 172, and the third magnetic body portion 173 are disposed side by side on a YZ plane. Accordingly, the first magnetic body portion 171, the second magnetic body portion 172, and the third magnetic body portion 173 can be easily attached to the fixed body 110 or the movable body 120. Accordingly, it is easy to manufacture the optical unit 100.

At least a part of the first magnetic body portion 171, the second magnetic body portion 172, and the third magnetic body portion 173 overlap when viewed from a direction parallel to the optical axis P. Accordingly, it is possible to reduce the driving resistance when swinging the movable body 120 in the first swing direction Da. Here, when viewed from a direction parallel to the optical axis P, the whole first magnetic body portion 171, second magnetic body portion 172, and third magnetic body portion 173 overlap.

In this manner, the first magnetic body portion 171 faces the first magnet 162. The first magnetic body 170a is mounted on the fixed body 110 with the FPC 180 interposed therebetween. One of the fixed body 110 and the movable body 120 includes the first magnet 162, and the other of the fixed body 110 and the movable body 120 includes the first magnetic body 170a.

The first swing mechanism 152 swings the movable body 120 with respect to the fixed body 110 about the first swing axis Sa1. The first swing mechanism 152 swings the movable body 120 with respect to the fixed body 110.

Typically, the first swing mechanism 152 is disposed in both the fixed body 110 and the movable body 120. The first swing mechanism 152 may include a magnet and a coil. Alternatively, the first swing mechanism 152 may swing the movable body 120 with respect to the fixed body 110 by supplying an electric signal to a shape memory alloy.

Note that when a coil that requires power supply is used as apart of the first swing mechanism 152, the coil is preferably disposed in the fixed body 110. For this reason, it is preferable that the first magnet 162 is disposed in the movable body 120, and the first magnetic body 170a is disposed in the fixed body 110 as illustrated in FIG. 3. As a result, even when a coil that requires power supply is used as apart of the first swing mechanism 152, since the coil can be disposed in the fixed body 110 that can secure more space than the movable body 120, the optical unit 100 can be manufactured in a small size.

The optical unit 100 is preferably manufactured in a small size. For example, in a case where the optical unit 100 is incorporated in the smartphone of FIG. 1, the size (e.g., length of fixed body 110 along X-axis direction or Y-axis direction) of the optical unit 100 is 10 mm or more and 50 mm or less.

Figure 5:
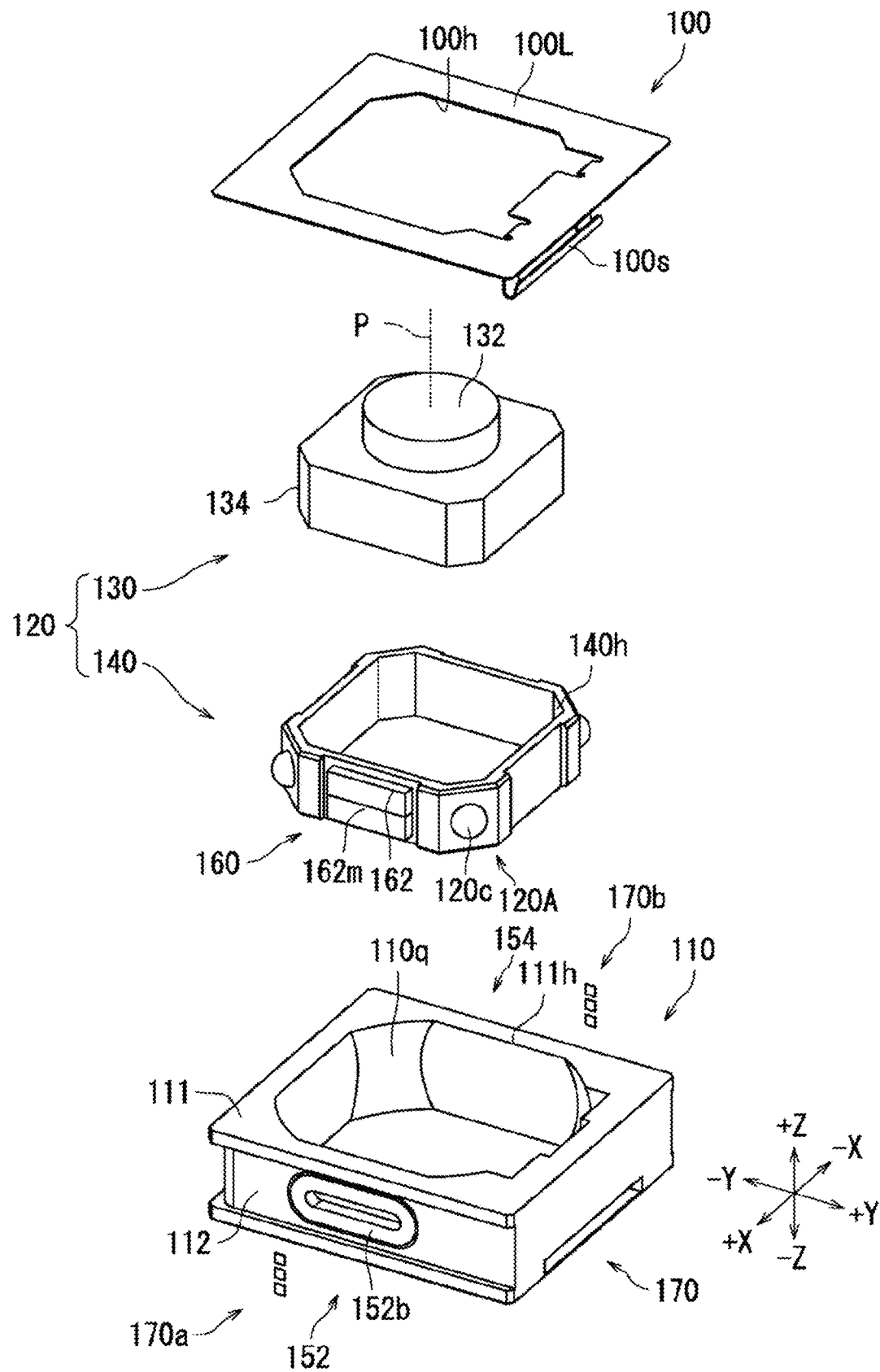
FIG. 5 is a schematic exploded perspective view of the optical unit of the present embodiment.

Next, a configuration of the optical unit 100 of the present embodiment will be described with reference to FIGS. 1 to 5. FIG. 5 is a schematic exploded perspective view of the optical unit 100 of the present embodiment. Note that in FIG. 5, the FPC 180 is omitted.

The fixed body 110 has a substantially tubular shape. The outer shape of the fixed body 110 is a rectangular parallelepiped shape with a through hole having a substantially rectangular cross section. The fixed body 110 is made of resin, for example. The fixed body 110 has a frame portion 111 and a side portion 112. The side portion 112 is supported by the frame portion 111. An opening 111h is formed in the frame portion 111.

As illustrated in FIG. 5, the fixed body 110 has multiple recesses 110q. The recess 110q is located on an inner peripheral surface of the side portion 112. When the movable body 120 is inserted into the fixed body 110, the recess 110q comes into contact with the movable body 120. Typically, when the movable body 120 swings with respect to the fixed body 110, the movable body 120 slides on the recess 110q while being in contact with the recess 110q. Each of the multiple recesses 110q preferably has a part of a concave spherical surface.

The recesses 110q are disposed at four corners of the fixed body 110. The radius of curvature of the four recesses 110q may be the same. In this case, the four recesses 110q may form parts of one large concave spherical surface. Alternatively, the radius of curvature of the four recesses 110q may be different.

The movable body 120 further has a contact member 120A. The contact member 120A is disposed on an outer surface of the movable body 120. The contact member 120A is in contact with the fixed body 110. Since the movable body 120 is in contact with the fixed body 110 with the contact member 120A interposed therebetween, the movable body 120 can be stably supported with respect to the fixed body 110. Note that, here, when the movable body 120 is inserted into the fixed body 110, the movable body 120 comes into contact with the fixed body 110. However, even when the movable body 120 is inserted into the fixed body 110, the movable body 120 may be configured to not come into contact with the fixed body 110.

The movable body 120 includes the optical element 130 and the holder 140. The optical element 130 is inserted into the frame of the holder 140.

The optical element 130 has the lens 132 and the housing 134. The housing 134 has a thin rectangular parallelepiped shape. The lens 132 is disposed in the housing 134. For example, the lens 132 is disposed on the optical axis P at the center of one surface of the housing 134. The optical axis P and the lens 132 face the subject, and light from a direction along the optical axis P is incident on the optical element 130.

Note that an image sensor or the like may be built in the housing 134. In this case, a flexible printed circuit (FPC) is preferably connected to the image sensor. A signal captured by the optical element 130 is extracted to the outside through the FPC.

The holder 140 has a frame shape. The holder 140 surrounds the optical element 130 from the outside and holds the optical element 130. For example, the holder 140 is made of resin. The holder 140 has a tubular shape and has a through hole 140h. The optical element 130 is inserted into the through hole 140h of the holder 140.

The contact member 120A is disposed on an outer peripheral surface of the holder 140. The contact member 120A is in contact with the fixed body 110.

The movable body 120 has multiple protrusions 120c protruding toward the fixed body 110. Specifically, the movable body 120 has the contact member 120A, and the contact member 120A has multiple protrusions 120c protruding toward the fixed body 110. The protrusion 120c is located on the radially outer side of the holder 140. The protrusion 120c protrudes radially outward from the holder 140 and comes into contact with the fixed body 110. As a result, the movable body 120 can be moved smoothly with respect to the fixed body 110.

The protrusion 120c may have a curved shape protruding in a curved manner. For example, the protrusion 120c is curved in a spherical shape. Each of the multiple protrusions 120c preferably has a part of a spherical surface. As a result, the movable body 120 can be moved smoothly with respect to the fixed body 110.

The first swing mechanism 152 swings the movable body 120 with respect to the fixed body 110 about the first swing axis Sa1. The first swing axis Sa1 extends in parallel to the Y-axis direction.

The first swing mechanism 152 has the first magnet 162 and a coil 152b. Typically, the first magnet 162 is a permanent magnet. The coil 152b faces the first magnet 162. The first magnet 162 is included in one of the fixed body 110 and the movable body 120, and the coil 152b is included in the other of the fixed body 110 and the movable body 120. The movable body 120 can be swung with respect to the fixed body 110 by the first magnet 162 and the coil 152b.

Here, the first magnet 162 is disposed in the movable body 120, and the coil 152b is disposed in the fixed body 110. The first magnet 162 is located on the +X direction side of the movable body 120, and the coil 152b is located on a side portion on the +X direction side of the fixed body 110.

The first magnet 162 is magnetized such that the magnetic pole of a surface facing radially outward (+X direction side) is different on either side of a first magnetization polarization line 162m extending along the Y-axis direction. One end portion of the first magnet 162 along the Z-axis direction has one polarity, and the other end portion has the other polarity.

For example, the yawing of the movable body 120 is corrected as follows. When shake in the yawing direction occurs in the optical unit 100, the shake is detected by a magnetic sensor (Hall element) (not illustrated), and the first swing mechanism 152 is driven on the basis of the result. Note that the shake of the optical unit 100 may be detected using a shake detection sensor (gyroscope) or the like. The first swing mechanism 152 corrects the shake on the basis of the detection result of the shake.

The magnet 160 generates a magnetic field. Typically, the magnet 160 is a permanent magnet. Here, the magnet 160 includes the first magnet 162. The first magnet 162 is attached to a side surface of the holder 140 and is located on an outer surface of the movable body 120.

The first magnet 162 is located on the +X direction side of the movable body 120 and extends in the Y-axis direction.

The first magnetic body 170a includes the first magnetic body portion 171, the second magnetic body portion 172, and the third magnetic body portion 173. The first magnetic body portion 171 is disposed to face the first magnet 162. The first magnetic body portion 171 is located on the +X direction of the movable body 120 and faces the first magnet 162.

Note that the first magnetic body 170a is preferably a soft magnetic material. Since the first magnetic body 170a is a soft magnetic material, the first magnet 162 can be attracted to a predetermined position by a relatively weak magnetic action as compared with a case where the first magnetic body 170a is a permanent magnet. For this reason, even if the driving force from the first swing mechanism 152 is relatively weak, the movable body 120 can be moved appropriately.

As understood from FIG. 5, the movable body 120 is manufactured by inserting the optical element 130 into the holder 140. The first magnet 162 is disposed along the Y-axis direction on the outer surface of the movable body 120.

Additionally, the first magnetic body 170a is disposed in the fixed body 110. When the movable body 120 is inserted into the fixed body 110, the first magnet 162 faces the first magnetic body 170a.

The lid 100L covers the fixed body 110 and the movable body 120. The lid 100L is formed of metal, for example. Note that the lid 100L may be formed of resin. The lid 100L is a plate-like member having a thickness in the Z-axis direction. The lid 100L is fixed to the +Z direction side (one side in optical axis direction) of the fixed body 110. In the present embodiment, the lid 100L is fixed to the frame portion 111 of the fixed body 110. The configuration for fixing the lid 100L to the fixed body 110 is not particularly limited. For example, lid 100L may be fixed to the fixed body 110 using a fastening member such as a screw, or may be fixed to the fixed body 110 using an adhesive.

The lid 100L has a hole 100h and a rotation stopper 100s. The rotation stopper 100s comes into contact with the movable body 120 to restrict excessive rotation of the movable body 120 in the rolling direction. The hole 100h penetrates the lid 100L in the Z-axis direction. The hole 100h of the lid 100L faces the opening 111h of the fixed body 110. The lens 132 of the movable body 120 is exposed to the outside of the fixed body 110 through the opening 111h of the fixed body 110 and the hole 100h of the lid 100L.

As described above, one of the movable body 120 and the fixed body 110 has the multiple protrusions 120c. The other of the movable body 120 and the fixed body 110 has the multiple recesses 110q. Hence, the slidability of the movable body 120 with respect to the fixed body 110 can be improved. Here, the movable body 120 has the multiple protrusions 120c, and the fixed body 110 has the multiple recesses 110q.

Figure 6:
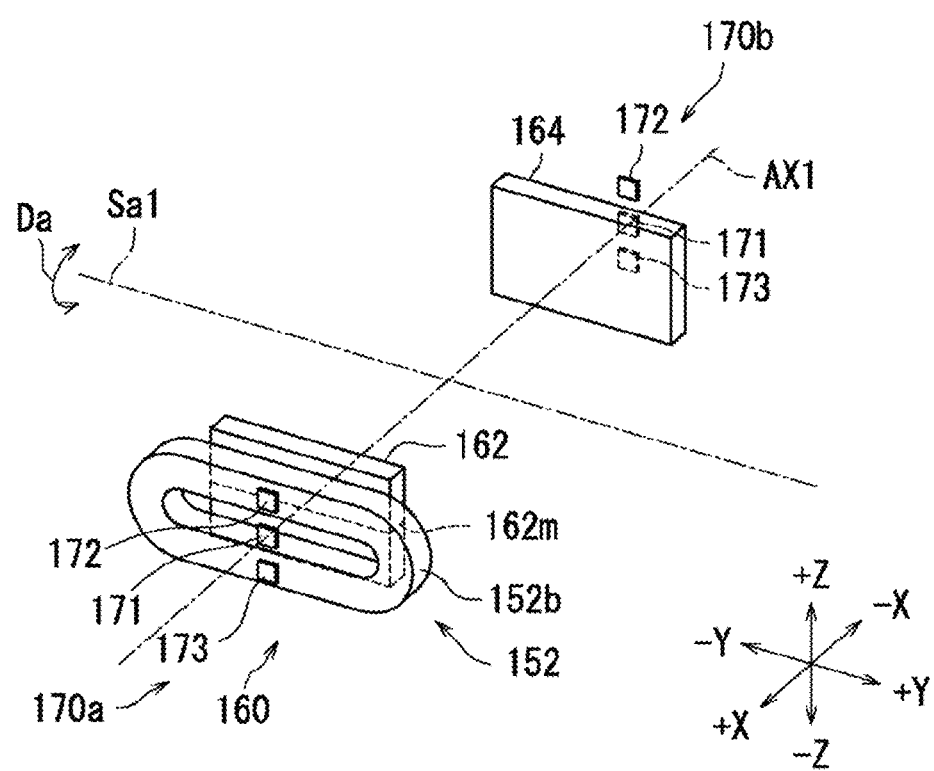
FIG. 6 is a schematic perspective view of the first swing mechanism, the magnet, and the first magnetic body in the optical unit illustrated in FIG. 5.

Next, the optical unit 100 of the present embodiment will be described with reference to FIGS. 1 to 6. FIG. 6 is a schematic perspective view of the first swing mechanism 152, the magnet 160, and the first magnetic body 170a in the optical unit 100 illustrated in FIG. 5.

As illustrated in FIG. 6, the first swing mechanism 152 has the first magnet 162 and the coil 152b. The first magnet 162 is magnetized such that the magnetic pole of a surface facing radially outward is different on either side of the first magnetization polarization line 162m extending along the Y-axis direction. One end portion of the first magnet 162 along the Z-axis direction has one polarity, and the other end portion has the other polarity.

By controlling the direction and the magnitude of the current flowing through the coil 152b, the direction and the magnitude of the magnetic field generated from the coil 152b can be changed. Hence, the first swing mechanism 152 can swing the movable body 120 about the first swing axis Sa1 by the interaction between the magnetic field generated from the coil 152b and the first magnet 162.

The first magnetic body portion 171, the second magnetic body portion 172, and the third magnetic body portion 173 are disposed perpendicular to the first magnetization polarization line 162m of the first magnet 162. Accordingly, the magnetic force can be used effectively.

The magnet 160 preferably further includes a second magnet 164 in addition to the first magnet 162. The second magnet 164 is attached to a side surface of the holder 140 (see FIG. 5) and is located on an outer surface of the movable body 120. The second magnet 164 is disposed on the −X direction side.

The optical unit 100 preferably further includes a second magnetic body 170b. The second magnetic body 170b is located on the −X direction side of the second magnet 164. Similarly to the first magnetic body 170a, the second magnetic body 170b has the first magnetic body portion 171, the second magnetic body portion 172, and the third magnetic body portion 173. In the second magnetic body 170b, similarly to the first magnetic body 170a, a magnetic body is disposed along the first swing direction Da. Accordingly, in addition to the first magnetic body 170a, the second magnetic body 170b, too, can reduce the driving resistance when swinging the movable body 120 in the first swing direction Da. Accordingly, the driving resistance can be reduced even more than a case where there is only one magnetic body on one side.

Note that in the optical unit 100 described above with reference to FIGS. 3 to 6, the first swing mechanism 152 swings the movable body 120 with respect to the fixed body 110 about the first swing axis Sa1. However, the present embodiment is not limited thereto. The movable body 120 may swing with respect to the fixed body 110 about an axis different from the first swing axis Sa1.

Figure 7:
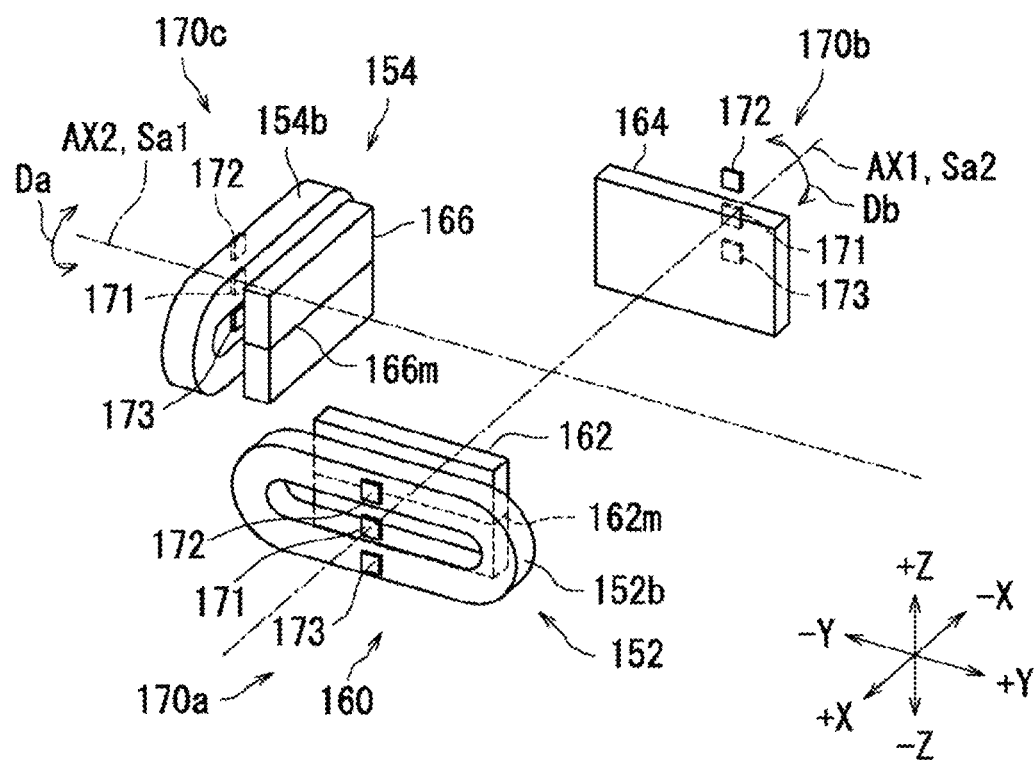
FIG. 7 is a schematic perspective view of the first swing mechanism, a second swing mechanism, the magnet, the first magnetic body, a second magnetic body, and a third magnetic body in the optical unit of the present embodiment.

Next, an optical unit 100 of the present embodiment will be described with reference to FIGS. 3 to 7. FIG. 7 is a schematic perspective view of the first swing mechanism 152, a second swing mechanism 154, the magnet 160, the first magnetic body 170a, the second magnetic body 170b, and a third magnetic body 170c in the optical unit 100 of the present embodiment. Note that the optical unit 100 of FIG. 7 has a configuration similar to the optical unit 100 described above with reference to FIG. 6, except that the second swing mechanism 154 is further provided and that a third magnet 166 and the third magnetic body 170c are further provided. Redundant description will be omitted.

As illustrated in FIG. 7, the magnet 160 includes the third magnet 166 in addition to the first magnet 162 and the second magnet 164. Additionally, the optical unit 100 further includes the third magnetic body 170c in addition to the first magnetic body 170a and the second magnetic body 170b. The first magnetic body 170a, the second magnetic body 170b, and the third magnetic body 170c face the first magnet 162, the second magnet 164, and the third magnet 166, respectively. As described above, one of the fixed body 110 and the movable body 120 further includes the third magnet 166, and the other of the fixed body 110 and the movable body 120 further includes the third magnetic body 170c facing the third magnet 166. Here, the movable body 120 further includes the third magnet 166, and the fixed body 110 further includes the third magnetic body 170c.

The first magnet 162 is located on the +X direction side of the movable body 120. The second magnet 164 is located on the −X direction side of the movable body 120. The third magnet 166 is located on the −Y direction side of the movable body 120.

The first magnetic body 170a is located on the +X direction side of the movable body 120. The second magnetic body 170b is located on the −X direction side of the movable body 120. The third magnetic body 170c is located on the −Y direction side of the movable body 120.

The first swing mechanism 152 swings the movable body 120 with respect to the fixed body 110. Specifically, the first swing mechanism 152 swings the movable body 120 with respect to the fixed body 110 about the first swing axis Sa1. For example, the first swing axis Sa1 extends parallel to the Y-axis direction. The Y-axis direction is a direction intersecting the optical axis P, and is an axis of rotation in the yawing direction.

The first swing mechanism 152 uses the magnet 160. Here, the first swing mechanism 152 includes the first magnet 162 and the coil 152b. The first magnet 162 is magnetized such that the magnetic pole of a surface facing radially outward is different on either side of the first magnetization polarization line 162m extending along the Y-axis direction. One end portion of the first magnet 162 along the Z-axis direction has one polarity, and the other end portion has the other polarity.

By controlling the direction and the magnitude of the current flowing through the coil 152b, the direction and the magnitude of the magnetic field generated from the coil 152b can be changed. Hence, the first swing mechanism 152 can swing the movable body 120 about the first swing axis Sa1 by the interaction between the magnetic field generated from the coil 152b and the first magnet 162.

The optical unit 100 further includes the second swing mechanism 154 in addition to the first swing mechanism 152. The second swing mechanism 154 swings the movable body 120 with respect to the fixed body 110 about a second swing axis Sa2. The second swing axis Sa2 is orthogonal to the first swing axis Sa1. For example, the second swing axis Sa2 extends parallel to the X-axis direction. The X-axis direction is a direction intersecting the optical axis P, and is an axis of rotation in the pitching direction. Note that the second swing axis Sa2 is a virtual axis.

The second swing mechanism 154 may include a magnet and a coil. Alternatively, the second swing mechanism 154 may swing the movable body 120 with respect to the fixed body 110 by supplying an electric signal to a shape memory alloy.

In FIG. 7, the second swing mechanism 154 uses the magnet 160. Here, the second swing mechanism 154 includes the third magnet 166 and a coil 154b. The third magnet 166 is magnetized such that the magnetic pole of a surface facing radially outward is different on either side of a third magnetization polarization line 166m extending along the X-axis direction. One end portion of the third magnet 166 along the Z-axis direction has one polarity, and the other end portion has the other polarity.

By controlling the direction and the magnitude of the current flowing through the coil 154b, the direction and the magnitude of the magnetic field generated from the coil 154b can be changed. Hence, the second swing mechanism 154 can swing the movable body 120 about the second swing axis Sa2 by the interaction between the magnetic field generated from the coil 154b and the third magnet 166.

As described above, the first swing mechanism 152 includes the first magnet 162 and the coil 152b facing the first magnet 162. Additionally, the second swing mechanism 154 includes the third magnet 166 and the coil 154b facing the third magnet 166. Hence, the first magnet 162 and the third magnet 166 for stably swinging the movable body 120 can be used for the first swing mechanism 152 and the second swing mechanism 154.

The second magnetic body 170b is located on the −X direction side of the second magnet 164. The third magnetic body 170c is located on the −Y direction side of the third magnet 166. Similarly to the first magnetic body 170a and the second magnetic body 170b, the third magnetic body 170c has the first magnetic body portion 171, the second magnetic body portion 172, and the third magnetic body portion 173.

The first magnetic body portion 171 of the third magnetic body 170c passes through an axis AX2 perpendicular to each of the first swing axis Sa1 and the optical axis P of the optical element 130. The first magnetic body portion 171 of the third magnetic body 170c faces the third magnet 166. Accordingly, the movable body 120 can be held at the initial position. The initial position indicates a position where the movable body 120 is not swung with respect to the fixed body 110 and a state in which the optical axis P is parallel to the Z-axis direction is maintained.

The second magnetic body portion 172 of the third magnetic body 170c is disposed on one side in a second swing direction Db of the first magnetic body portion 171 of the third magnetic body 170c. Here, the second magnetic body portion 172 of the third magnetic body 170c is disposed on the +Z direction side of the first magnetic body portion 171 of the third magnetic body 170c. Accordingly, when the movable body 120 is swung to one side in the second swing direction Db, the second magnetic body portion 172 of the third magnetic body 170c can generate an attraction force as an aid. As a result, it is possible to reduce the driving resistance when swinging the movable body 120 to one side in the second swing direction Db. The second swing direction Db is a direction in which the movable body 120 swings with respect to the fixed body 110 about the second swing axis Sa2.

The third magnetic body portion 173 of the third magnetic body 170c is disposed on the other side in the second swing direction Db of the first magnetic body portion 171 of the third magnetic body 170c. Here, the third magnetic body portion 173 of the third magnetic body 170c is disposed on the −Z direction side of the first magnetic body portion 171 of the third magnetic body 170c. Accordingly, when the movable body 120 is swung to the other side in the second swing direction Db, the third magnetic body portion 173 can generate an attraction force as an aid. As a result, it is possible to reduce the driving resistance when swinging the movable body 120 to the other side in the second swing direction Db.

In this manner, the magnetic body is disposed along the second swing direction Db. Accordingly, it is possible to reduce the driving resistance when swinging the movable body 120 in the second swing direction Db as well.

Note that while the optical unit 100 described above with reference to FIG. 7 has the first magnetic body 170a, the second magnetic body 170b, and the third magnetic body 170c, the present embodiment is not limited thereto. The optical unit 100 may further include a fourth magnetic body 170d.

Figure 8:
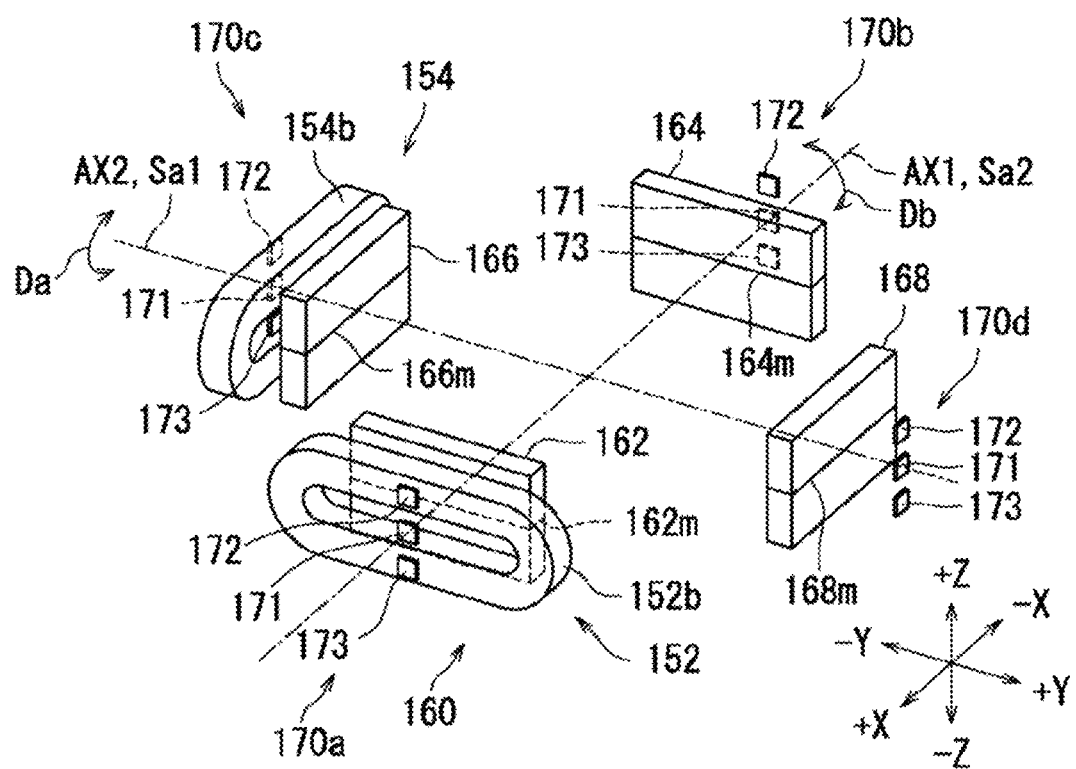
FIG. 8 is a schematic perspective view of the first swing mechanism, the second swing mechanism, the magnet, the first magnetic body, the second magnetic body, the third magnetic body, and a fourth magnetic body in the optical unit of the present embodiment.

Next, an optical unit 100 of the present embodiment will be described with reference to FIGS. 3 to 8. FIG. 8 is a schematic perspective view of the first swing mechanism 152, the second swing mechanism 154, the magnet 160, the first magnetic body 170a, the second magnetic body 170b, the third magnetic body 170c, and the fourth magnetic body 170d in the optical unit 100 of the present embodiment. Note that the optical unit 100 of FIG. 8 has a configuration similar to the optical unit 100 described above with reference to FIG. 7, except that the magnet 160 further includes a fourth magnet 168 and that the optical unit 100 further includes the fourth magnetic body 170d. Redundant description will be omitted.

The magnet 160 includes the fourth magnet 168 in addition to the first magnet 162, the second magnet 164, and the third magnet 166. The first magnet 162 is located on the +X direction side of the movable body 120, and the second magnet 164 is located on the −X direction side of the movable body 120. The third magnet 166 is located on the −Y direction side of the movable body 120, and the fourth magnet 168 is located on the +Y direction side of the movable body 120.

Additionally, the optical unit 100 includes the fourth magnetic body 170d in addition to the first magnetic body 170a, the second magnetic body 170b, and the third magnetic body 170c. The first magnetic body 170a, the second magnetic body 170b, the third magnetic body 170c, and the fourth magnetic body 170d face the first magnet 162, the second magnet 164, the third magnet 166, and the fourth magnet 168, respectively. The first magnetic body 170a is located on the +X direction side of the movable body 120, and the second magnetic body 170b is located on the −X direction side of the movable body 120. The third magnetic body 170c is located on the −Y direction side of the movable body 120, and the fourth magnetic body 170d is located on the +Y direction side of the movable body 120.

Similarly to the third magnetic body 170c, the fourth magnetic body 170d has the first magnetic body portion 171, the second magnetic body portion 172, and the third magnetic body portion 173. In the fourth magnetic body 170d, similarly to the third magnetic body 170c, a magnetic body is disposed along the second swing direction Db. Accordingly, in addition to the third magnetic body 170c, the fourth magnetic body 170d, too, can reduce the driving resistance when swinging the movable body 120 in the second swing direction Db. Accordingly, the driving resistance can be reduced even more than a case where there is only one magnetic body on one side.

Note that here, the first magnetization polarization line 162m of the first magnet 162 extends in parallel with a second magnetization polarization line 164m of the second magnet 164. Specifically, the first magnet 162 is magnetized such that the magnetic pole of a surface facing radially outward is different on either side of the first magnetization polarization line 162m extending along the Y-axis direction. One end portion of the first magnet 162 along the Z-axis direction has one polarity, and the other end portion has the other polarity. Similarly, the second magnet 164 is magnetized such that the magnetic pole of a surface facing radially outward is different on either side of the second magnetization polarization line 164m extending along the Y-axis direction. One end portion of the second magnet 164 along the Z-axis direction has one polarity, and the other end portion has the other polarity.

Additionally, the third magnetization polarization line 166m of the third magnet 166 extends in parallel with a fourth magnetization polarization line 168m of the fourth magnet 168. Specifically, the third magnet 166 is magnetized such that the magnetic pole of a surface facing radially outward is different on either side of the third magnetization polarization line 166m extending along the Y-axis direction. One end portion of the third magnet 166 along the Z-axis direction has one polarity, and the other end portion has the other polarity. Similarly, the fourth magnet 168 is magnetized such that the magnetic pole of a surface facing radially outward is different on either side of the fourth magnetization polarization line 168m extending along the Y-axis direction. One end portion of the fourth magnet 168 along the Z-axis direction has one polarity, and the other end portion has the other polarity.

Note, however, that the first magnetization polarization line 162m of the first magnet 162 does not have to be parallel to the second magnetization polarization line 164m of the second magnet 164, and the extending direction of the first magnetization polarization line 162m of the first magnet 162 may be shifted from the extending direction of the second magnetization polarization line 164m of the second magnet 164. In this case, the extending direction of the first magnetization polarization line 162m of the first magnet 162 is preferably shifted by 90° with respect to the extending direction of the second magnetization polarization line 164m of the second magnet 164. As a result, the frictional resistance when the movable body 120 swings about the second swing axis Sa2 can be further reduced.

Additionally, in the above description with reference to FIGS. 3 to 8, the movable body 120 swings with respect to the fixed body 110 about one swing axis (first swing axis Sa1) or two orthogonal swing axes (first swing axis Sa1 and second swing axis Sa2). However, the present embodiment is not limited thereto. The movable body 120 may swing with respect to the fixed body 110 about three swing axes.

Figure 9A:
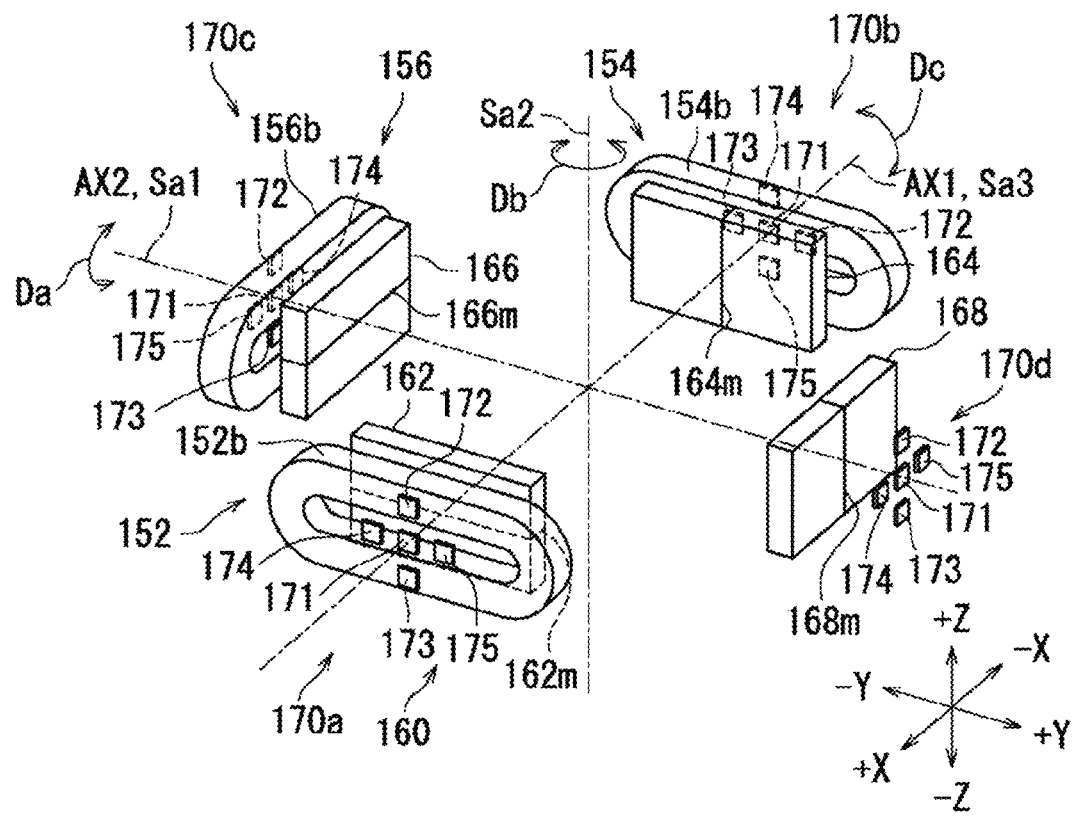
FIG. 9A is a schematic perspective view of the first swing mechanism, the second swing mechanism, a third swing mechanism, the magnet, the first magnetic body, the second magnetic body, the third magnetic body, and the fourth magnetic body in the optical unit of the present embodiment.
Figure 9B:
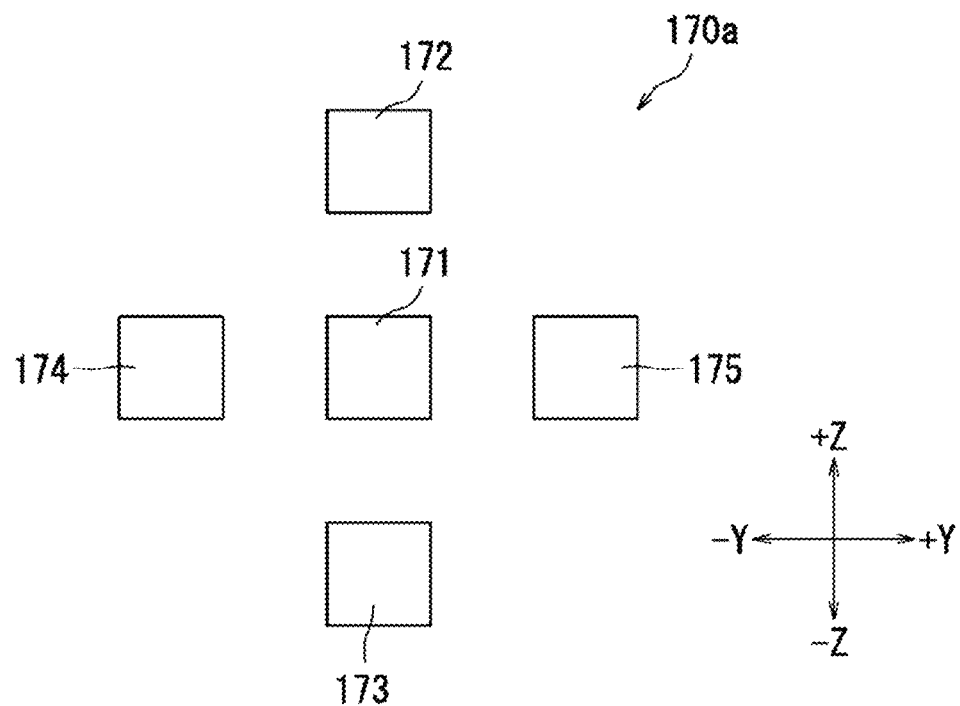
FIG. 9B is a schematic side view of the first magnetic body.

Next, a configuration of an optical unit 100 of the present embodiment will be described with reference to FIGS. 9A and 9B. FIG. 9A is a schematic perspective view of the first swing mechanism 152, the second swing mechanism 154, a third swing mechanism 156, the magnet 160, the first magnetic body 170a, the second magnetic body 170b, the third magnetic body 170c, and the fourth magnetic body 170d in the optical unit 100 of the present embodiment. FIG. 9B is a schematic side view of the first magnetic body 170a. Note that the optical unit 100 of FIG. 9A is mainly different from the optical unit 100 described above with reference to FIG. 8 in that the third swing mechanism 156 is provided in addition to the first swing mechanism 152 and the second swing mechanism 154, and that the second swing axis Sa2 is parallel to the optical axis P. Description of the configuration similar to that of the optical unit 100 described above with reference to FIG. 8 will be omitted to avoid redundancy.

As illustrated in FIG. 9A, the optical unit 100 includes the third swing mechanism 156 in addition to the first swing mechanism 152 and the second swing mechanism 154.

The first swing mechanism 152 swings the movable body 120 with respect to the fixed body 110. Specifically, the first swing mechanism 152 swings the movable body 120 with respect to the fixed body 110 about the first swing axis Sa1. Here, the first swing axis Sa1 extends parallel to the Y-axis direction. The Y-axis direction is a direction intersecting the optical axis P, and is an axis of rotation in the yawing direction. Typically, the first swing axis Sa1 is orthogonal to the optical axis P.

The second swing mechanism 154 swings the movable body 120 with respect to the fixed body 110. Specifically, the second swing mechanism 154 swings the movable body 120 with respect to the fixed body 110 about the second swing axis Sa2. Here, the second swing axis Sa2 extends parallel to the Z-axis direction. The Z-axis direction is parallel to the optical axis P and is an axis of rotation in the rolling direction.

The third swing mechanism 156 swings the movable body 120 with respect to the fixed body 110. Specifically, the third swing mechanism 156 swings the movable body 120 with respect to the fixed body 110 about a third swing axis Sa3. Here, the third swing axis Sa3 extends parallel to the X-axis direction. The X-axis direction is a direction intersecting the optical axis P, and is an axis of rotation in the pitching direction. Typically, the third swing axis Sa3 is orthogonal to the optical axis P. Note that the third swing axis Sa3 is a virtual axis.

The fixed body 110 supports the movable body 120 so as to be swingable in the second swing direction Db about the second swing axis Sa2. The fixed body 110 supports the movable body 120 so as to be swingable in a third swing direction Dc about the third swing axis Sa3. The third swing direction Dc is a direction in which the movable body 120 swings with respect to the fixed body 110 about the third swing axis Sa3.

The first swing axis Sa1, the second swing axis Sa2, and the third swing axis Sa3 are orthogonal to one another. One of the first swing axis Sa1 and the second swing axis Sa2 is perpendicular to the optical axis P. Here, the first swing axis Sa1 is perpendicular to the optical axis P. One of the first swing axis Sa1, the second swing axis Sa2, and the third swing axis Sa3 is parallel to the optical axis P. Additionally, the other of the first swing axis Sa1 and the second swing axis Sa2 is parallel to the optical axis P. Here, the second swing axis Sa2 is parallel to the optical axis P.

One of the movable body 120 and the fixed body 110 includes the first magnet 162, the second magnet 164, the third magnet 166, and the fourth magnet 168. Here, the movable body 120 includes the first magnet 162, the second magnet 164, the third magnet 166, and the fourth magnet 168. Additionally, the other of the movable body 120 and the fixed body 110 includes the first magnetic body 170a, the second magnetic body 170b, the third magnetic body 170c, and the fourth magnetic body 170d. Here, the fixed body 110 includes the first magnetic body 170a, the second magnetic body 170b, the third magnetic body 170c, and the fourth magnetic body 170d.

The first swing mechanism 152 includes the first magnet 162 and the coil 152b. The first magnet 162 is magnetized such that the magnetic pole of a surface facing radially outward is different on either side of the first magnetization polarization line 162m extending along the Y-axis direction. One end portion of the first magnet 162 along the Z-axis direction has one polarity, and the other end portion has the other polarity.

Here, the second swing mechanism 154 includes the second magnet 164 and the coil 154b. The second magnet 164 is magnetized such that the magnetic pole of a surface facing radially outward is different on either side of the second magnetization polarization line 164m extending along the Z-axis direction. One end portion of the second magnet 164 along the Y-axis direction has one polarity, and the other end portion has the other polarity.

Here, the third swing mechanism 156 includes the third magnet 166 and a coil 156b. The third magnet 166 is magnetized such that the magnetic pole of a surface facing radially outward is different on either side of the third magnetization polarization line 166m extending along the X-axis direction. One end portion of the third magnet 166 along the Z-axis direction has one polarity, and the other end portion has the other polarity.

Additionally, the fourth magnet 168 is magnetized such that the magnetic pole of the surface facing radially outward is different on either side of the fourth magnetization polarization line 168m extending along the Z-axis direction. One end portion of the fourth magnet 168 along the X-axis direction has one polarity, and the other end portion has the other polarity.

In the optical unit 100 illustrated in FIG. 9A, the first swing mechanism 152 can swing the movable body 120 in the yawing direction, the second swing mechanism 154 can swing the movable body 120 in the rolling direction, and the third swing mechanism 156 can swing the movable body 120 in the pitching direction. Hence, in the optical unit 100, the movable body 120 can be corrected in an arbitrary direction.

Additionally, in the optical unit 100 illustrated in FIG. 9A, the extending direction of the first magnetization polarization line 162m is shifted from the extending direction of the second magnetization polarization line 164m, and the extending direction of the third magnetization polarization line 166m is shifted from the extending direction of the fourth magnetization polarization line 168m of the fourth magnet 168. Typically, it is preferable that the extending direction of the first magnetization polarization line 162m is shifted by 90° with respect to the extending direction of the second magnetization polarization line 164m, and the extending direction of the third magnetization polarization line 166m is shifted by 90° with respect to the extending direction of the fourth magnetization polarization line 168m. As a result, the frictional resistance when the movable body 120 swings about the first swing axis Sa1 and the second swing axis Sa2 can be further reduced.

Note that it is preferable that one or more coils face each of three magnets of the first magnet 162, the second magnet 164, the third magnet 166, and the fourth magnet 168. Here, the first magnet 162, the second magnet 164, and the third magnet 166 face the coil 152b, the coil 154b, and the coil 154b, respectively.

The extending direction of the second magnetization polarization line 164m of the second magnet 164 among the three magnets (first magnet 162, second magnet 164, and third magnet 166) is parallel to the optical axis P of the optical element 130, and the extending directions of the remaining first magnetization polarization line 162m of the first magnet 162 and the third magnetization polarization line 166m of the third magnet 166 are orthogonal to the optical axis P. As a result, the movable body 120 can swing along the three swing axes (first swing axis Sa1, second swing axis Sa2, and third swing axis Sa3).

As illustrated in FIG. 9B, the first magnetic body 170*a* further includes a fourth magnetic body portion 174 and a fifth magnetic body portion 175 in addition to the first magnetic body portion 171, the second magnetic body portion 172, and the third magnetic body portion 173. In the first magnetic body 170*a*, the first magnetic body portion 171, the second magnetic body portion 172, the third magnetic body portion 173, the fourth magnetic body portion 174, and the fifth magnetic body portion 175 are arranged in a cross shape spaced apart from one another.

The fourth magnetic body portion 174 is disposed on one side in the second swing direction Db of the first magnetic body portion 171. Here, the fourth magnetic body portion 174 is disposed on the −Y direction side of the first magnetic body portion 171. Accordingly, when the movable body 120 is swung to one side in the second swing direction Db, the fourth magnetic body portion 174 can generate an attraction force as an aid. As a result, it is possible to reduce the driving resistance when swinging the movable body 120 to one side in the second swing direction Db.

The fifth magnetic body portion 175 is disposed on the other side in the second swing direction Db of the first magnetic body portion 171. Here, the fifth magnetic body portion 175 is disposed on the +Y direction side of the first magnetic body portion 171. Accordingly, when the movable body 120 is swung to the other side in the second swing direction Db, the fifth magnetic body portion 175 can generate an attraction force as an aid. As a result, it is possible to reduce the driving resistance when swinging the movable body 120 to the other side in the second swing direction Db.

In this manner, the magnetic body is disposed along the second swing direction Db. Accordingly, even when the movable body 120 is swung in the second swing direction Db by the first magnetic body 170*a*, the driving resistance can be reduced.

Additionally, as illustrated in FIG. 9A, the second magnetic body 170*b* includes the first magnetic body portion 171, the second magnetic body portion 172, the third magnetic body portion 173, the fourth magnetic body portion 174, and the fifth magnetic body portion 175.

The first magnetic body portion 171 of the second magnetic body 170*b* passes through the axis AX1 perpendicular to each of the second swing axis Sa2 and the optical axis P of the optical element 130. The first magnetic body portion 171 of the second magnetic body 170*b* faces the second magnet 164. Accordingly, the movable body 120 can be held at the initial position.

The second magnetic body portion 172 of the second magnetic body 170*b* is disposed on one side in the second swing direction Db of the first magnetic body portion 171 of the second magnetic body 170*b*. Here, the second magnetic body portion 172 of the second magnetic body 170*b* is disposed on the +Y direction side of the first magnetic body portion 171 of the second magnetic body 170*b*. Accordingly, when the movable body 120 is swung to one side in the second swing direction Db, the second magnetic body portion 172 of the second magnetic body 170*b* can generate an attraction force as an aid. As a result, the driving resistance can be reduced.

The third magnetic body portion 173 of the second magnetic body 170*b* is disposed on the other side in the second swing direction Db of the first magnetic body portion 171 of the second magnetic body 170*b*. Here, the third magnetic body portion 173 of the second magnetic body 170*b* is disposed on the −Y direction side of the first magnetic body portion 171. Accordingly, when the movable body 120 is swung to the other side in the second swing direction Db, the third magnetic body portion 173 of the second magnetic body 170*b* can generate an attraction force as an aid. As a result, the driving resistance can be reduced.

Additionally, as illustrated in FIG. 9A, the third magnetic body 170*c* includes the first magnetic body portion 171, the second magnetic body portion 172, the third magnetic body portion 173, the fourth magnetic body portion 174, and the fifth magnetic body portion 175.

The first magnetic body portion 171 of the third magnetic body 170*c* passes through the axis AX2 perpendicular to each of the third swing axis Sa3 and the optical axis P of the optical element 130. The first magnetic body portion 171 of the third magnetic body 170*c* faces the third magnet 166. Accordingly, the movable body 120 can be held at the initial position.

The second magnetic body portion 172 of the third magnetic body 170*c* is disposed on one side in the third swing direction Dc of the first magnetic body portion 171 of the third magnetic body 170*c*. Here, the second magnetic body portion 172 of the third magnetic body 170*c* is disposed on the +Z direction side of the first magnetic body portion 171 of the third magnetic body 170*c*. Accordingly, when the movable body 120 is swung to one side in the third swing direction Dc, the second magnetic body portion 172 of the third magnetic body 170*c* can generate an attraction force as an aid. As a result, it is possible to reduce the driving resistance when swinging the movable body 120 to one side in the third swing direction Dc.

The third magnetic body portion 173 of the third magnetic body 170*c* is disposed on the other side in the third swing direction Dc of the first magnetic body portion 171 of the third magnetic body 170*c*. Here, the third magnetic body portion 173 of the third magnetic body 170*c* is disposed on the −Y direction side of the first magnetic body portion 171 of the third magnetic body 170*c*. Accordingly, when the movable body 120 is swung to the other side in the third swing direction Dc, the third magnetic body portion 173 of the third magnetic body 170*c* can generate an attraction force as an aid. As a result, it is possible to reduce the driving resistance when swinging the movable body 120 to the other side in the third swing direction Dc.

As described above, in the first magnetic body 170*a*, the magnetic body is disposed along the first swing direction Da. In the second magnetic body 170*b*, the magnetic body is disposed along the second swing direction Db. Additionally, in the third magnetic body 170*c*, the magnetic body is disposed along the third swing direction Dc. Accordingly, it is possible to reduce the driving resistance when swinging the movable body 120 in the triaxial direction.

Figure 10:
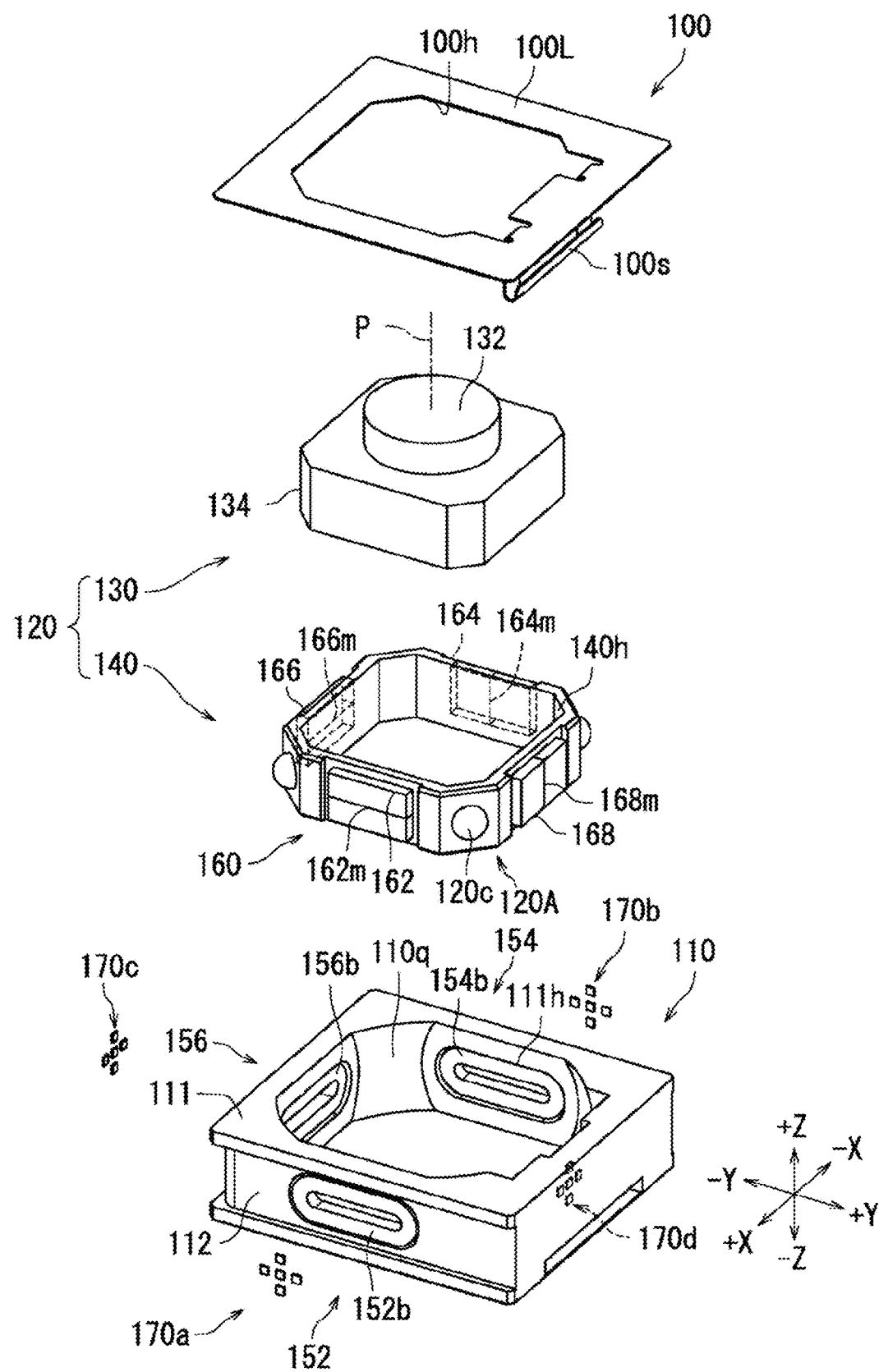
FIG. 10 is a schematic exploded perspective view of the optical unit of the present embodiment.

Next, a configuration of an optical unit 100 of the present embodiment will be described with reference to FIGS. 9A and 10. FIG. 10 is a schematic exploded perspective view of the optical unit 100 of the present embodiment. Note that in FIG. 10, the FPC 180 is omitted.

As illustrated in FIG. 10, the magnet 160 includes the first magnet 162, the second magnet 164, the third magnet 166, and the fourth magnet 168. Here, the magnet 160 is attached to an outer peripheral surface of the holder 140. The first magnet 162 is located on the +X direction side of the holder 140. The second magnet 164 is located on the −X direction side of the holder 140. The third magnet 166 is located on the −Y direction side of the holder 140. The fourth magnet 168 is located on the +Y direction side of the holder 140.

The optical unit 100 includes the first magnetic body 170a, the second magnetic body 170b, the third magnetic body 170c, and the fourth magnetic body 170d. Here, the first magnetic body 170a, the second magnetic body 170b, the third magnetic body 170c, and the fourth magnetic body 170d are attached to the fixed body 110 or the FPC 180. The first magnetic body 170a is located on the +X direction side of the FPC 180. The second magnetic body 170b is located on the −X direction side of the FPC 180. The third magnetic body 170c is located on the −Y direction side of the FPC 180. The fourth magnetic body 170d is located on the +Y direction side of an inner surface of the fixed body 110.

The first swing mechanism 152 includes the first magnet 162 and the coil 152b facing the first magnet 162. The first magnet 162 and the coil 152b are located on the +X direction side of the movable body 120.

The second swing mechanism 154 includes the second magnet 164 and the coil 154b facing the second magnet 164. The second magnet 164 and the coil 154b are located on the −X direction side of the movable body 120.

The third swing mechanism 156 includes the third magnet 166 and the coil 156b facing the third magnet 166. The third magnet 166 and the coil 156b are located on the −Y direction side of the movable body 120.

For example, pitching, yawing, and rolling correction of the movable body 120 are performed as follows. When shake in at least one of the pitching direction, the yawing direction, and the rolling direction occurs in the optical unit 100, the shake is detected by a magnetic sensor (Hall element) (not illustrated), and based on the result, the first swing mechanism 152, the second swing mechanism 154, and the third swing mechanism 156 are driven to swing the movable body 120. Note that the shake of the optical unit 100 may be detected using a shake detection sensor (gyroscope) or the like. Based on the detection result of the shake, a current is supplied to the coil 152b, the coil 154b, and the coil 156b to correct the shake.

Note that in the first magnetic body 170a described with reference to FIG. 9B, the first magnetic body portion 171, the second magnetic body portion 172, the third magnetic body portion 173, the fourth magnetic body portion 174, and the fifth magnetic body portion 175 are arranged in a cross shape spaced apart from one another. However, the present embodiment is not limited thereto. The fourth magnetic body portion 174 and the fifth magnetic body portion 175 may be connected to the first magnetic body portion 171.

Figure 11:
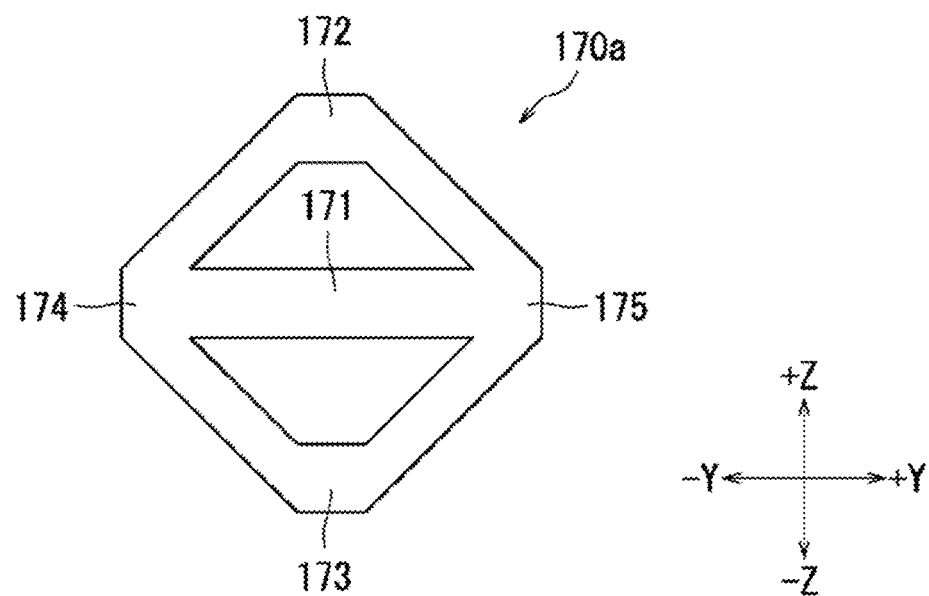
FIG. 11 is a schematic side view of the first magnetic body.

A modification of the first magnetic body 170a will be described with reference to FIG. 11. FIG. 11 is a schematic side view of the first magnetic body 170a.

As illustrated in FIG. 11, the first magnetic body 170a includes the first magnetic body portion 171, the second magnetic body portion 172, the third magnetic body portion 173, the fourth magnetic body portion 174, and the fifth magnetic body portion 175.

The first magnetic body portion 171 and the second magnetic body portion 172 are spaced apart from each other. The first magnetic body portion 171 and the third magnetic body portion 173 are spaced apart from each other. The first magnetic body portion 171 is connected to the fourth magnetic body portion 174. The first magnetic body portion 171 is connected to the fifth magnetic body portion 175. The second magnetic body portion 172 is connected to the fourth magnetic body portion 174 and the fifth magnetic body portion 175. The third magnetic body portion 173 is connected to the fourth magnetic body portion 174 and the fifth magnetic body portion 175. Accordingly, in the first magnetic body 170a, the first magnetic body portion 171, the second magnetic body portion 172, the third magnetic body portion 173, the fourth magnetic body portion 174, and the fifth magnetic body portion 175 are coupled. As a result, the number of components can be reduced.

Note that while the first magnetic body portion 171, the second magnetic body portion 172, and the third magnetic body portion 173 are disposed side by side on the same plane in the above description with reference to FIGS. 3 to 11, the present embodiment is not limited thereto. The first magnetic body portion 171, the second magnetic body portion 172, and the third magnetic body portion 173 may be disposed on different planes.

Figure 12:
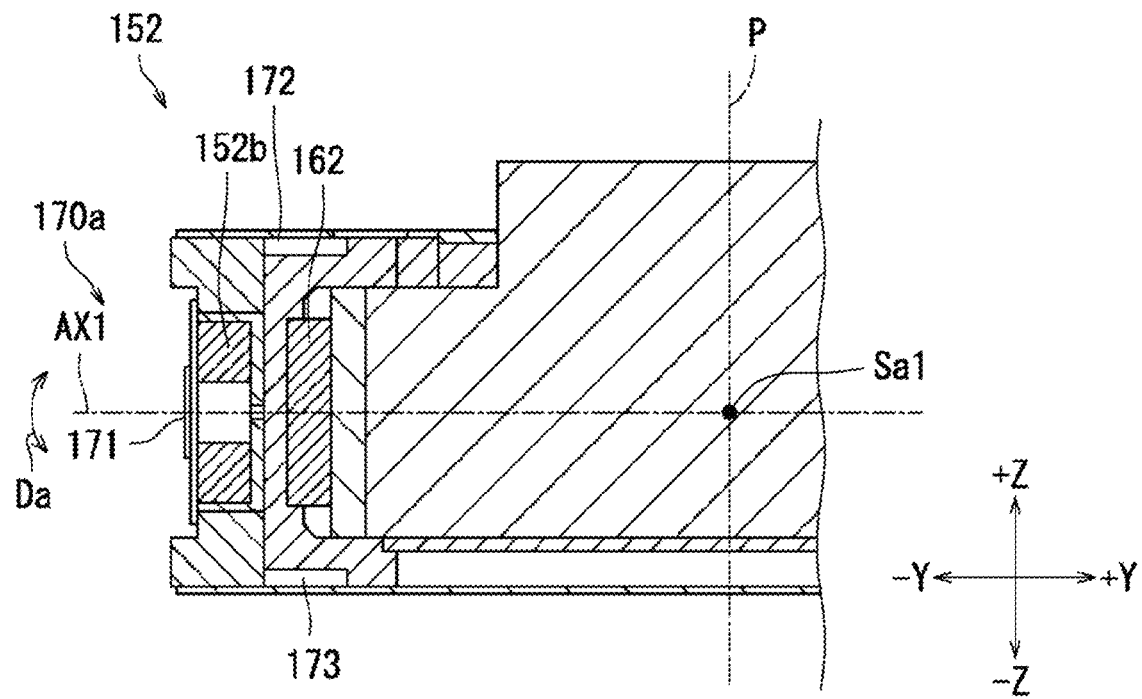
FIG. 12 is an enlarged view of a part of a cross-sectional view of the optical unit taken along the X-axis.

Next, a configuration of an optical unit 100 of the present embodiment will be described with reference to FIG. 12. FIG. 12 is an enlarged view of a part of a cross-sectional view of the optical unit 100 taken along the X-axis.

As illustrated in FIG. 12, the first magnetic body portion 171, the second magnetic body portion 172, and the third magnetic body portion 173 are disposed on different planes. Here, the first magnetic body portion 171 is disposed on the −Y direction side so as to face the first magnet 162. The second magnetic body portion 172 is disposed above (+Z direction side) the first magnet 162. The third magnetic body portion 173 is disposed below (−Z direction side) the first magnet 162. Since the first magnetic body portion 171, the second magnetic body portion 172, and the third magnetic body portion 173 are disposed on different planes, the degree of freedom in arrangement of the magnetic bodies is improved. Accordingly, the magnetic bodies can be disposed at positions where the magnetic force can be used more effectively.

Note that in the first magnetic body 170a described with reference to FIG. 9B, the first magnetic body portion 171, the second magnetic body portion 172, the third magnetic body portion 173, the fourth magnetic body portion 174, and the fifth magnetic body portion 175 are arranged in a cross shape spaced apart from one another. However, the present embodiment is not limited thereto. For example, the magnetic body portions included in the first magnetic body 170a may be connected by a connecting portion 190.

Figure 13:
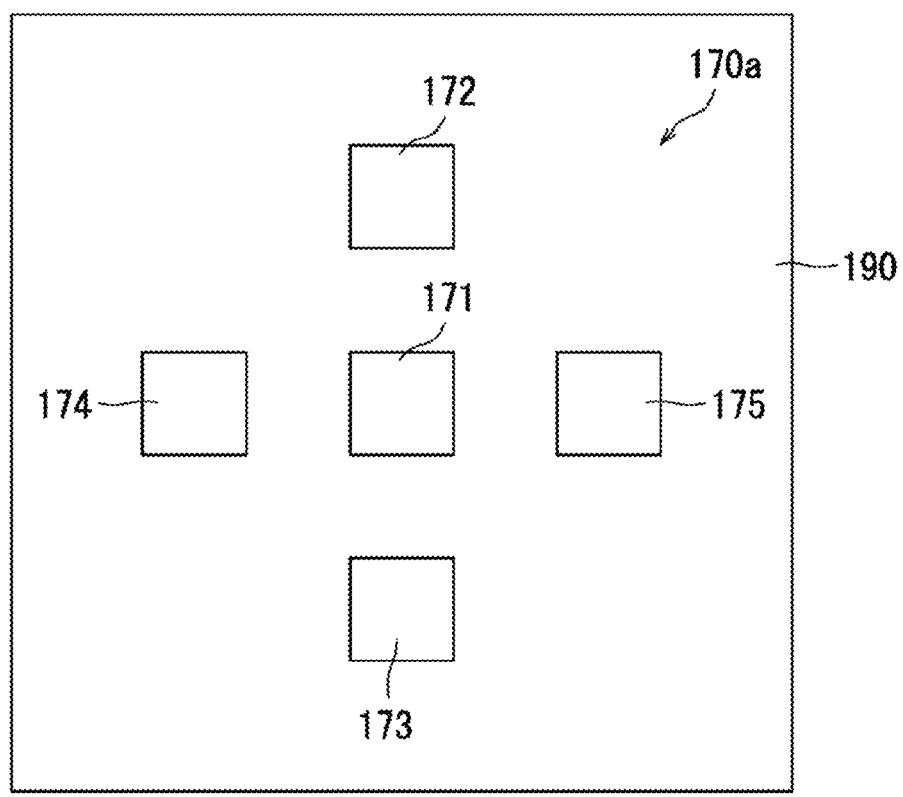
FIG. 13 is a schematic side view of the first magnetic body.

The connecting portion 190 will be described with reference to FIG. 13. FIG. 13 is a schematic side view of the first magnetic body 170a.

As illustrated in FIG. 13, the optical unit 100 may further include the connecting portion 190. The connecting portion 190 connects each magnetic body portion included in the first magnetic body 170a. Here, the connecting portion 190 connects the first magnetic body portion 171, the second magnetic body portion 172, the third magnetic body portion 173, the fourth magnetic body portion 174, and the fifth magnetic body portion 175. The connecting portion 190 is a sheet-like resin, for example. In this case, the magnetic body portions are connected by embedding each magnetic body portion in the resin of the sheet. Then, the sheet-like resin in which the magnetic body portions are embedded is attached to the fixed body 110 or the movable body 120. Alternatively, the connecting portion 190 is an adhesive sheet, for example. The magnetic body portions are connected by attaching each magnetic body portion to the adhesive sheet. Then, the adhesive sheet to which the magnetic body portions are attached is attached to the fixed body 110 or the movable body 120. Accordingly, since the number of components can be reduced, the optical unit 100 can be manufactured more easily.

The embodiments of the present invention have been described above with reference to the drawings (FIGS. 1 to 13). Note, however, that the present invention is not limited to the above embodiments, and can be implemented in various modes without departing from the gist thereof. For easy understanding, the drawings schematically illustrate each constituent element as the subject, and the thickness, length, number, and the like of each illustrated constituent element are different from actual ones for convenience of drawing. Additionally, the material, shape, dimension, and the like of each constituent element illustrated in the above embodiments are mere examples and are not particularly limited, and various modifications can be made without substantially departing from the effects of the present invention.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An optical unit, comprising:
a movable body having an optical element;
a fixed body that surrounds the movable body and supports the movable body so as to be swingable in a first swing direction about a first swing axis; and
a first swing mechanism that swings the movable body with respect to the fixed body about the first swing axis, wherein
one of the movable body and the fixed body has a first magnet;
the other of the movable body and the fixed body has a first magnetic body;
the first magnetic body includes
a first magnetic body portion which faces the first magnet and through which an axis perpendicular to each of the first swing axis and an optical axis of the optical element passes,
a second magnetic body portion disposed on one side in the first swing direction of the first magnetic body portion, and
a third magnetic body portion disposed on the other side in the first swing direction of the first magnetic body portion;
all of the first magnetic body portion, the second magnetic body portion and the third magnetic body portion comprise soft magnetic material;
the optical unit further comprises a second swing mechanism that swings the movable body with respect to the fixed body about a second swing axis;
the fixed body supports the movable body so as to be swingable in a second swing direction about the second swing axis;
one of the first swing axis and the second swing axis is perpendicular to the optical axis;
the other of the first swing axis and the second swing axis is parallel to the optical axis; and
the first magnetic body has:
a fourth magnetic body portion disposed on one side in the second swing direction of the first magnetic body portion, and
a fifth magnetic body portion disposed on the other side in the second swing direction of the first magnetic body portion.

2. The optical unit according to claim 1, wherein
the first magnetic body portion and the second magnetic body portion are spaced apart from each other in the first swing direction, and
the first magnetic body portion and the third magnetic body portion are spaced apart from each other in the first swing direction.

3. The optical unit according to claim 1, wherein based on the first magnetic body portion, the second magnetic body portion and the third magnetic body portion are disposed at positions line-symmetric with respect to a direction perpendicular to each of the optical axis and the first swing axis.

4. The optical unit according to claim 1, wherein the first magnetic body portion, the second magnetic body portion, and the third magnetic body portion are disposed side by side on the same plane.

5. The optical unit according to claim 4, wherein at least a part of the first magnetic body portion, the second magnetic body portion, and the third magnetic body portion overlap when viewed from a direction parallel to the optical axis.

6. The optical unit according to claim 1, wherein the first magnetic body portion, the second magnetic body portion, and the third magnetic body portion are disposed on different planes.

7. The optical unit according to claim 1, wherein the first magnetic body portion, the second magnetic body portion, and the third magnetic body portion are disposed perpendicular to a first magnetization polarization line of the first magnet.

8. The optical unit according to claim 1, wherein
the first magnetic body portion and the second magnetic body portion are spaced apart from each other;
the first magnetic body portion and the third magnetic body portion are spaced apart from each other;
the first magnetic body portion is connected to the fourth magnetic body portion;
the first magnetic body portion is connected to the fifth magnetic body portion;
the second magnetic body portion is connected to the fourth magnetic body portion and the fifth magnetic body portion;
the third magnetic body portion is connected to the fourth magnetic body portion and the fifth magnetic body portion; and
both of the fourth magnetic body portion and the fifth magnetic body portion comprise soft magnetic material.

9. The optical unit according to claim 1, further comprising a connecting portion that connects magnetic body portions included in the first magnetic body.

10. The optical unit according to claim 1, wherein a thickness of the first magnetic body portion is thinner than a thickness of at least one of the second magnetic body portion or the third magnetic body portion of the first magnetic body.

11. The optical unit according to claim 1, wherein a thickness of the first magnetic body portion is thicker than a thickness of at least one of the second magnetic body portion or the third magnetic body portion of the first magnetic body.

12. The optical unit according to claim 1, wherein
one of the movable body and the fixed body has a plurality of protrusions;
the other of the movable body and the fixed body has a plurality of recesses; and each of the plurality of protrusions and each of the plurality of recesses have a part of a spherical surface.

13. The optical unit according to claim 1, wherein the first swing mechanism comprises:
the first magnet included in the one of the movable body and the fixed body, and
a coil included in the other of the movable body and the fixed body; and
the coil is different from the first magnetic body portion, the second magnetic body portion and the third magnetic body portion.

14. The optical unit according to claim 13, wherein the coil has
a longer dimension in a direction parallel to the first swing axis, and
a shorter dimension in the first swing direction.

15. An optical unit, comprising:
a movable body having an optical element;
a fixed body that surrounds the movable body and supports the movable body so as to be swingable in a first swing direction about a first swing axis; and
a first swing mechanism that swings the movable body with respect to the fixed body about the first swing axis, wherein
one of the movable body and the fixed body has a first magnet;
the other of the movable body and the fixed body has a first magnetic body;
the first magnetic body includes:
a first magnetic body portion which faces the first magnet and through which an axis perpendicular to each of the first swing axis and an optical axis of the optical element passes,
a second magnetic body portion disposed on one side in the first swing direction of the first magnetic body portion, and
a third magnetic body portion disposed on the other side in the first swing direction of the first magnetic body portion;
all of the first magnetic body portion, the second magnetic body portion and the third magnetic body portion comprise soft magnetic material;
the optical unit further comprises:
a second swing mechanism that swings the movable body with respect to the fixed body about a second swing axis, and
a third swing mechanism that swings the movable body with respect to the fixed body about a third swing axis;
the fixed body supports the movable body so as to be swingable in a second swing direction about the second swing axis;
the fixed body supports the movable body so as to be swingable in a third swing direction about the third swing axis;
the first swing axis, the second swing axis, and the third swing axis are orthogonal to one another;
one of the first swing axis, the second swing axis, and the third swing axis is parallel to the optical axis;
one of the movable body and the fixed body has a second magnet and a third magnet;
the other of the movable body and the fixed body has a second magnetic body and a third magnetic body;
the second magnetic body has:

a first magnetic body portion which faces the second magnet and through which an axis perpendicular to each of the second swing axis and an optical axis of the optical element passes, a second magnetic body portion disposed on one side in the second swing direction of the first magnetic body portion, and
a third magnetic body portion disposed on the other side in the second swing direction of the first magnetic body portion; and
the third magnetic body portion has:
a first magnetic body portion which faces the third magnet and through which an axis perpendicular to each of the third swing axis and an optical axis of the optical element passes, a second magnetic body portion disposed on one side in the third swing direction of the first magnetic body portion, and
a third magnetic body portion disposed on the other side in the third swing direction of the first magnetic body portion.

16. An optical unit, comprising:
a movable body having an optical element;
a fixed body that surrounds the movable body and supports the movable body so as to be swingable in a first swing direction about a first swing axis;
a first swing mechanism that swings the movable body with respect to the fixed body about the first swing axis; and
a second swing mechanism that swings the movable body with respect to the fixed body about a second swing axis,
wherein
one of the movable body and the fixed body has a first magnet;
the other of the movable body and the fixed body has a first magnetic body;
the first magnetic body includes
a first magnetic body portion which faces the first magnet and through which an axis perpendicular to each of the first swing axis and an optical axis of the optical element passes,
a second magnetic body portion disposed on one side in the first swing direction of the first magnetic body portion, and
a third magnetic body portion disposed on the other side in the first swing direction of the first magnetic body portion;
the fixed body supports the movable body so as to be swingable in a second swing direction about the second swing axis;
one of the first swing axis and the second swing axis is perpendicular to the optical axis;
the other of the first swing axis and the second swing axis is parallel to the optical axis; and
the first magnetic body has
a fourth magnetic body portion disposed on one side in the second swing direction of the first magnetic body portion, and
a fifth magnetic body portion disposed on the other side in the second swing direction of the first magnetic body portion.

* * * * *